US012707312B2

(12) United States Patent
Chan et al.

(10) Patent No.: US 12,707,312 B2
(45) **Date of Patent: *Aug. 11, 2026**

(54) SYSTEMS AND METHODS FOR SELECTING LOCATIONS TO VALIDATE AUTOMATED VEHICLE DATA TRANSMISSION

(71) Applicant: State Farm Mutual Automobile Insurance Company, Bloomington, IL (US)

(72) Inventors: Aaron Scott Chan, San Jose, CA (US); Kenneth Jason Sanchez, San Francisco, CA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,916

(22) Filed: May 8, 2024

(65) Prior Publication Data

US 2024/0298205 A1 Sep. 5, 2024

Related U.S. Application Data

(63) Continuation of application No. 18/160,586, filed on Jan. 27, 2023, now Pat. No. 12,058,552, which is a (Continued)

(51) Int. Cl.
*H04W 24/10* (2009.01)
*G05D 1/00* (2006.01)
(Continued)

(52) U.S. Cl.
CPC .......... *H04W 24/10* (2013.01); *G05D 1/0088* (2013.01); *G05D 1/81* (2024.01);
(Continued)

(58) Field of Classification Search
CPC ......... H04W 24/10; G05D 1/81; G06Q 40/08; G07C 5/008; G07C 5/0808; H04L 43/10;
(Continued)

(56) References Cited

U.S. PATENT DOCUMENTS 4,491,290 A 1/1985 Douglas
4,549,181 A 10/1985 Tachibana et al.
(Continued)

FOREIGN PATENT DOCUMENTS

CN 108037760 A 5/2018
EP 3239686 A1 11/2017
(Continued)

OTHER PUBLICATIONS

D. Wittmann, M. Lienkamp and C. Wang, "Method for comprehensive and adaptive risk analysis for the development of automated driving," 2017 IEEE 20th International Conference on Intelligent Transportation Systems (ITSC), Yokohama, Japan, 2017, pp. 1-7 (Year: 2017).*

(Continued)

*Primary Examiner* — Joan T Goodbody
(74) *Attorney, Agent, or Firm* — Armstrong Teasdale LLP

(57) ABSTRACT

A system for validating automated vehicle data transmission capabilities of a vehicle is provided. The system includes a vehicle data transmission diagnostics (VDTD) server in communication with the vehicle and a plurality of roadside evaluation units. The VDTD server includes at least one processor and at least one memory device, and is programmed to: (i) determine that a data latency risk evaluation (DLRE) should be performed for the vehicle, (ii) transmit a DLRE request to the vehicle, (iii) receive, from the vehicle, a response to the transmitted DLRE request including trip data, the trip data including a selected route to be taken by the vehicle, (iv) interrogate the plurality of roadside evalu-
(Continued)

ation units based upon the received trip data, and (v) select, based upon the interrogation, one of the plurality of roadside evaluation units to be a data latency evaluation checkpoint for the vehicle during the upcoming trip.

12 Claims, 12 Drawing Sheets

Related U.S. Application Data continuation of application No. 16/688,788, filed on Nov. 19, 2019, now Pat. No. 11,587,366.

(60) Provisional application No. 62/775,176, filed on Dec. 4, 2018, provisional application No. 62/769,838, filed on Nov. 20, 2018.

(51) Int. Cl.
*G05D 1/81* (2024.01)
*G06Q 40/08* (2012.01)
*G07C 5/00* (2006.01)
*G07C 5/08* (2006.01)
*H04L 9/40* (2022.01)
*H04L 43/10* (2022.01)

(52) U.S. Cl.
CPC ............. *G06Q 40/08* (2013.01); *G07C 5/008* (2013.01); *G07C 5/0808* (2013.01); *H04L 43/10* (2013.01); *H04L 63/1433* (2013.01)

(58) Field of Classification Search
CPC . H04L 63/1433; H04L 43/106; H04L 41/145; H04L 43/50
See application file for complete search history.

(56) References Cited

U.S. PATENT DOCUMENTS 5,367,667 A 11/1994 Wahlquist et al.
5,808,907 A 9/1998 Shetty et al.
5,815,071 A 9/1998 Doyle
5,875,397 A 2/1999 Sasin et al.
6,028,537 A 2/2000 Suman et al.
6,035,053 A 3/2000 Yoshioka et al.
6,127,947 A 10/2000 Uchida et al.
6,154,658 A 11/2000 Caci
6,181,994 B1 1/2001 Colson et al.
6,223,125 B1 4/2001 Hall
6,240,365 B1 5/2001 Bunn
6,263,268 B1 7/2001 Nathanson
6,330,499 B1 12/2001 Chou et al.
6,681,174 B1 1/2004 Harvey et al.
6,972,669 B2 12/2005 Saito et al.
7,096,101 B2 8/2006 Sonnenrein et al.
7,920,944 B2 4/2011 Gould et al.
8,738,180 B2 5/2014 Shi et al.
9,311,760 B2 4/2016 Downey et al.
9,336,436 B1 5/2016 Dowdall
9,424,606 B2 8/2016 Wilson, II et al.
9,524,648 B1 12/2016 Gopalakrishnan et al.
9,559,973 B1 1/2017 Aithal et al.
9,575,161 B1 2/2017 Haghighi et al.
9,606,539 B1 3/2017 Kentley et al.
9,626,874 B1 4/2017 Gupta et al.
9,715,711 B1 7/2017 Konrardy et al.
9,725,171 B1 8/2017 Carmack et al.
9,805,423 B1 10/2017 Konrardy et al.
9,830,748 B2 11/2017 Rosenbaum
9,836,895 B1 12/2017 Nygaard et al.
9,940,676 B1 4/2018 Biemer
9,990,782 B2 6/2018 Rosenbaum
10,266,155 B2 4/2019 Detrick
10,269,190 B2 4/2019 Rosenbaum
10,431,023 B1 10/2019 Watson et al.
10,466,717 B1 11/2019 Su et al.
10,467,824 B2 11/2019 Rosenbaum
10,471,967 B2 11/2019 Dai et al.
10,489,994 B2 11/2019 Dudar
10,825,098 B1 11/2020 Bueche, Jr.
10,832,330 B1 11/2020 Grant et al.
10,884,902 B2 1/2021 Kislovskiy et al.
11,227,452 B2 1/2022 Rosenbaum
11,407,410 B2 8/2022 Rosenbaum
11,524,707 B2 12/2022 Rosenbaum
11,594,083 B1 2/2023 Rosenbaum
11,653,394 B2 5/2023 Asterjadhi et al.
2002/0095249 A1 7/2002 Lang
2004/0258279 A1 12/2004 Hirvonen et al.
2005/0065779 A1 3/2005 Odinak
2005/0125117 A1 6/2005 Breed
2005/0154500 A1 7/2005 Sonnenrein et al.
2006/0122748 A1 6/2006 Nou
2006/0190148 A1 8/2006 Grenn
2006/0229777 A1 10/2006 Hudson et al.
2007/0093947 A1 4/2007 Gould et al.
2007/0108384 A1 5/2007 Mueller et al.
2007/0274227 A1* 11/2007 Rauscher ................ H04L 43/50
370/252
2008/0021607 A1 1/2008 Kato et al.
2008/0147316 A1 6/2008 Okawa
2008/0189000 A1 8/2008 Duong
2008/0243351 A1 10/2008 Isogai et al.
2009/0143987 A1 6/2009 Bect et al.
2009/0325534 A1 12/2009 Kennelly
2012/0330541 A1 12/2012 Sakugawa et al.
2013/0234880 A1 9/2013 Lee et al.
2013/0239992 A1 9/2013 Detrick
2014/0136414 A1 5/2014 Abhyanker
2014/0139369 A1 5/2014 Baba
2014/0152488 A1 6/2014 Baba
2014/0272811 A1 9/2014 Palan
2014/0309885 A1 10/2014 Ricci
2015/0170287 A1 6/2015 Tirone et al.
2015/0187019 A1 7/2015 Fernandes et al.
2015/0350160 A1 12/2015 Nathan et al.
2016/0061984 A1 3/2016 Partner
2016/0121791 A1 5/2016 Shimizu
2016/0358018 A1 12/2016 Yoo et al.
2017/0141873 A1 5/2017 Mandeville-Clarke et al.
2017/0270615 A1 9/2017 Fernandes et al.
2017/0294054 A1 10/2017 Rosenbaum
2017/0295069 A1 10/2017 Sweet, III et al.
2017/0315551 A1 11/2017 Mimura et al.
2017/0372431 A1 12/2017 Perl et al.
2018/0002894 A1 1/2018 Yamamoto et al.
2018/0086351 A1 3/2018 Zhu et al.
2018/0088576 A1 3/2018 Kong et al.
2018/0130123 A1 5/2018 Ross et al.
2018/0143632 A1 5/2018 Zhu et al.
2018/0176111 A1 6/2018 Lopes
2018/0237027 A1 8/2018 Lundsgaard
2018/0276910 A1 9/2018 Pitt et al.
2018/0281709 A1 10/2018 Mendez
2018/0322711 A1 11/2018 Weimerskirch
2018/0339712 A1 11/2018 Kislovskiy et al.
2018/0341881 A1 11/2018 Kislovskiy et al.
2018/0375594 A1 12/2018 Kildal et al.
2019/0041853 A1 2/2019 Jain et al.
2019/0079659 A1 3/2019 Adenwala et al.
2019/0095872 A1 3/2019 Lalwani et al.
2019/0106117 A1 4/2019 Goldberg
2019/0108768 A1 4/2019 Mohamed
2019/0129831 A1 5/2019 Goldberg
2019/0137287 A1* 5/2019 Pazhayampallil ..... G01C 21/34
2019/0195623 A1 6/2019 Deutsch et al.
2019/0383624 A1* 12/2019 Magzimof ........... H04B 17/373
2019/0389378 A1 12/2019 Adams et al.
2020/0201315 A1 6/2020 Gogna et al.

(56) References Cited

U.S. PATENT DOCUMENTS

| | | | |
|---|---|---|---|
| 2021/0108926 | A1 | 4/2021 | Tran |
| 2021/0326996 | A1 | 10/2021 | Childers |
| 2022/0092893 | A1 | 3/2022 | Rosenbaum |
| 2022/0130185 | A1 | 4/2022 | Morelli et al. |
| 2022/0340148 | A1 | 10/2022 | Rosenbaum |
| 2023/0060300 | A1 | 3/2023 | Rosenbaum |

FOREIGN PATENT DOCUMENTS

| | | | |
|---|---|---|---|
| EP | 3578433 | B1 | 8/2020 |
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| JP | 2009237971 | A | 10/2009 |
| JP | 2017062179 | A | 3/2017 |
| WO | 2016154944 | A1 | 10/2016 |
| WO | 2019043446 | A1 | 3/2019 |

OTHER PUBLICATIONS

Babulal GM, Addison A, Ghoshal N, Stout SH, Vernon EK, Sellan M, Roe CM. "Development and interval testing of a naturalistic driving methodology to evaluate driving behavior in clinical research." F1000Res. Jul. 15, 2016;5:1716. (Year: 2016).*

Bai et al., "Reliability Analysis of DSRC Wireless Communication for Vehicle Safety Applications," Intelligent Transportation Systems Conference, 2006, ITSC'06 IEEE, pp. 355-362.

Cusano, "The shift to autonomous vehicles means opportunity for insurers," Property Casualty 360°, A National Underwriter Company, Retrieved from URL: https://www.propertycasualty360.com/2017/08/15/the-shift-to-autonomous-vehicles-means-opportunity.

Papadimitratos et al., "Vehicular communication systems: Enabling technologies, applications, and future outlook on intelligent transportation," IEEE communications magazine, 47(11), Nov. 2009.

Pell, "C-V2X startup targets autonomous vehicle safety," eeNews Automotive, dated Apr. 30, 2018, Retrieved from URL: http://www.eenewsautomotive.com/news/c-v2x-startup-targets-autonomous-vehicle-safety.

Shladover et al., "Automated vehicle control developments in the PATH program," IEEE Transactions on vehicular technology, 40(1), pp. 114-130, Feb. 1991.

* cited by examiner

800
VDTD SERVER 304
TEPD
302
TEPD
202

SYSTEMS AND METHODS FOR SELECTING LOCATIONS TO VALIDATE AUTOMATED VEHICLE DATA TRANSMISSION

CROSS-REFERENCE TO RELATED APPLICATIONS

This application is a continuation of, and claims the benefit of priority to, U.S. patent application Ser. No. 18/160,586, filed Jan. 27, 2023, entitled "SYSTEMS AND METHODS FOR SELECTING LOCATIONS TO VALIDATE AUTOMATED VEHICLE DATA TRANSMISSION," which is a continuation of, and claims the benefit of priority to, U.S. patent application Ser. No. 16/688,788, filed Nov. 19, 2019, entitled "SYSTEMS AND METHODS FOR SELECTING LOCATIONS TO VALIDATE AUTOMATED VEHICLE DATA TRANSMISSION," which claims the benefit of priority to U.S. Provisional Patent Application No. 62/769,838, filed Nov. 20, 2018, entitled "SYSTEMS AND METHODS FOR SELECTING LOCATIONS TO VALIDATE AUTOMATED VEHICLE DATA TRANSMISSION," and to U.S. Provisional Patent Application No. 62/775,176, filed Dec. 4, 2018, entitled "SYSTEMS AND METHODS FOR ASSESSING VEHICLE DATA TRANSMISSION CAPABILITIES," the entire contents and disclosure of which are hereby incorporated by reference herein in their entirety.

FIELD OF THE DISCLOSURE

The present disclosure relates to assessing autonomous vehicle performance, and more particularly, to a network-based systems and methods for selecting a roadside evaluation unit to validate an autonomous vehicle's data transmission and reception capabilities.

BACKGROUND

Autonomous and semi-autonomous vehicles may require significant sensor telemetry to quantify environmental/surrounding features for optimally efficient and safe vehicle navigation and operation. Vehicles equipped with onboard sensors, such as LIDAR and RADAR, may be able to detect obstacles and other features of the landscape. In addition, autonomous vehicles receive sensor data from external sources, such as satellite GPS data, which may be used to provide additional information, such as positional data. Data from these sources may be combined with previously stored data and analyzed for autonomous vehicle operation. For example, in the case of GPS data, location data may be overlaid on previously stored mapping data to determine routing plans. In other cases, real-time traffic information may be combined with previously designated route plans to determine alternate travel paths.

Autonomous and semi-autonomous vehicles, unlike wholly manually-operated vehicles, may become "data hubs" that collect data from multiple sources and transmit data to nearby vehicles or other remote computing devices. The ability of these automated vehicles to pilot safely depends on each vehicle's capability to transmit, receive, and process significant volumes of data. In addition, the processing power needed to analyze the data for navigation and vehicle control is substantial. For optimal performance, significant bandwidth and low latency is required.

In some autonomous vehicle systems, communication with a centralized server may also be required. For example, in some known systems, individual vehicles acting as part of a highly automated vehicle network may receive instructions and control commands from a central server. In these known systems, autonomous or semi-autonomous vehicles that suffer from network connectivity interruptions and/or are unable to efficiently and accurately process all of the data necessary for optimal vehicle operation may present a risk to drivers and passengers within these vehicles and to those of surrounding vehicles. Accordingly, there exists a need to evaluate data transmission and reception capabilities of highly automated vehicles while these vehicles are on the road.

BRIEF SUMMARY

The present embodiments may relate to systems and methods for validating automated vehicle data transmission capabilities of a vehicle. The system may include a vehicle data transmission diagnostics (VDTD) server, a vehicle (e.g., a vehicle control system), one or more roadside evaluation units (REUs), one or more insurance network computer devices, one or more traffic lights (e.g., traffic light sensors), and/or one or more reference databases. The system may be configured to: (i) determine that a data latency risk evaluation (DLRE) should be performed on the vehicle; (ii) transmit, to the vehicle, a data latency risk evaluation (DLRE) request; (iii) receive, from the vehicle, a response to the transmitted DLRE request including trip data, the trip data including a selected route to be taken by the vehicle for an upcoming trip; (iv) interrogate the plurality of roadside evaluation units based upon the received trip data, the plurality of roadside evaluation units being located along the selected route; and/or (v) select, based upon the interrogation, one of the plurality of roadside evaluation units to be a data latency evaluation checkpoint for the vehicle during the upcoming trip.

In one aspect, a computer system for validating automated or autonomous vehicle data transmission capabilities of a vehicle may be provided. The computer system may include a vehicle data transmission diagnostics (VDTD) server in communication with the vehicle and a plurality of roadside evaluation units. The VDTD server may comprise at least one processor and at least one memory device. The at least one processor may be programmed to: (i) determine that a data latency risk evaluation (DLRE) should be performed for the vehicle; (ii) transmit, to the vehicle, a data latency risk evaluation (DLRE) request to determine a time period and a geographical region for performing the DLRE; (iii) receive, from the vehicle, a response to the transmitted DLRE request including trip data, wherein the trip data includes a selected route to be taken by the vehicle for an upcoming trip; (iv) interrogate the plurality of roadside evaluation units based upon the received trip data, the plurality of roadside evaluation units being located along the selected route; and/or (v) select, based upon the interrogation, one of the plurality of roadside evaluation units to be a data latency evaluation checkpoint for the vehicle during the upcoming trip. The computer system may include additional, less, or alternate functionality, including that discussed elsewhere herein.

In another aspect, a computer-implemented method for validating automated or autonomous vehicle data transmission capabilities of a vehicle may be provided. The method may be implemented using a vehicle data transmission diagnostics (VDTD) server. The VDTD server may be in communication with the vehicle and a plurality of roadside evaluation units. The VDTD server may comprise at least one processor and at least one memory device. The method may include: (i) determining, by the at least one processor, that a data latency risk evaluation (DLRE) should be performed for the vehicle; (ii) transmitting, by the at least one processor to the vehicle, a data latency risk evaluation (DLRE) request to determine a time period and a geographical region for performing the DLRE; (iii) receiving, from the vehicle at the at least one processor, a response to the transmitted DLRE request including trip data, wherein the trip data includes a selected route to be taken by the vehicle for an upcoming trip; (iv) interrogating, by the at least one processor, the plurality of roadside evaluation units based upon the received trip data, the plurality of roadside evaluation units being located along the selected route; and/or (v) selecting, based upon the interrogation by the at least one processor, one of the plurality of roadside evaluation units to be a data latency evaluation checkpoint for the vehicle during the upcoming trip. The method may include additional, less, or alternate functionality, including those discussed elsewhere herein.

In a further aspect, at least one non-transitory computer-readable storage media having computer-executable instructions embodied thereon may be provided. When executed by a vehicle data transmission diagnostics (VDTD) server that is in communication with a vehicle and a plurality of roadside evaluation units, the VDTD server comprising at least one processor, the computer-executable instructions may cause the at least one processor to: (i) determine that a data latency risk evaluation (DLRE) should be performed for the vehicle; (ii) transmit, to the vehicle, a data latency risk evaluation (DLRE) request to determine a time period and a geographical region for performing the DLRE; (iii) receive, from the vehicle, a response to the transmitted DLRE request including trip data, wherein the trip data includes a selected route to be taken by the vehicle for an upcoming trip; (iv) interrogate the plurality of roadside evaluation units based upon the received trip data, the plurality of roadside evaluation units being located along the selected route; and/or (v) select, based upon the interrogation, one of the plurality of roadside evaluation units to be a data latency evaluation checkpoint for the vehicle during the upcoming trip. The storage media may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
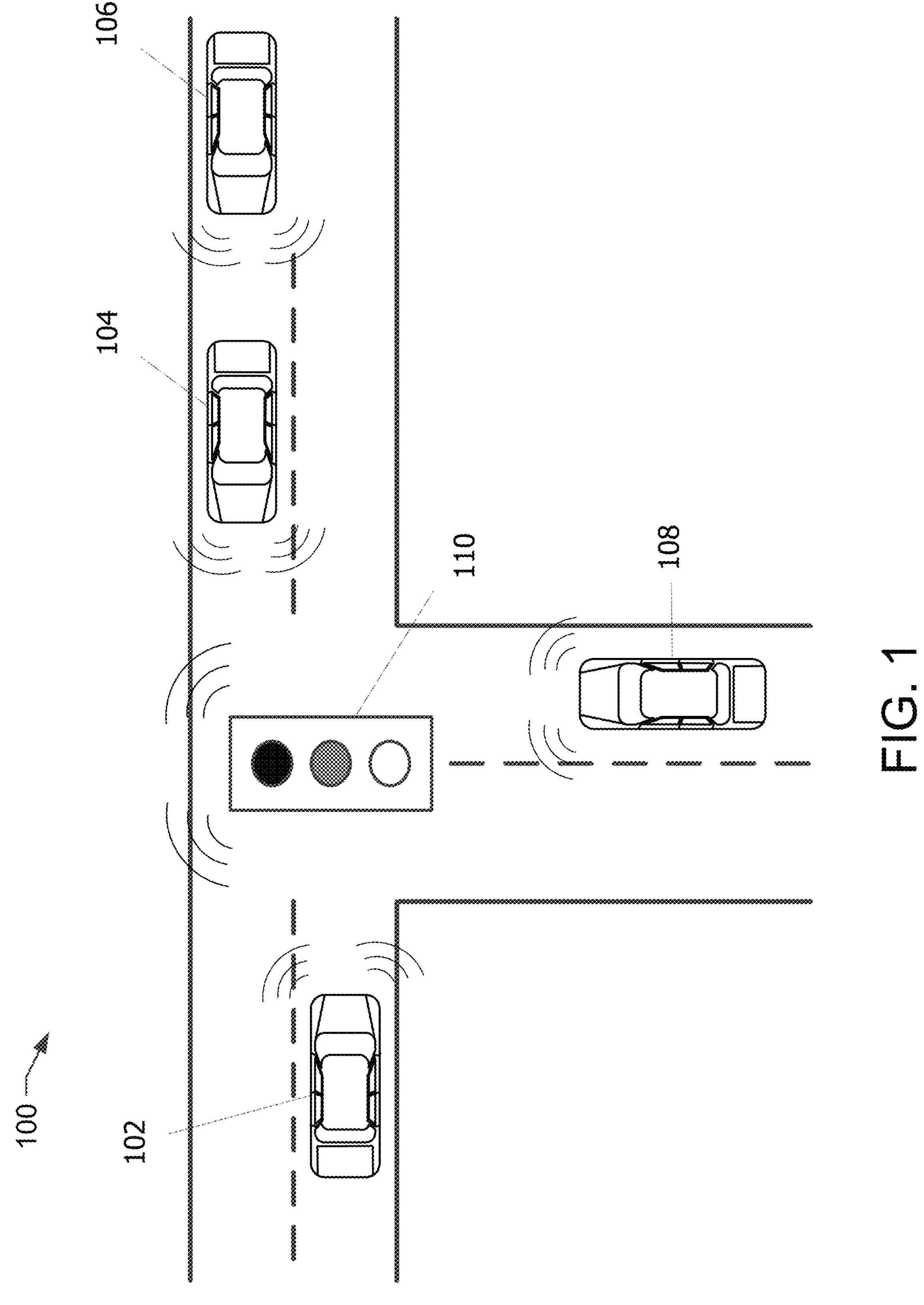
FIG. 1 illustrates an exemplary vehicle network of autonomous or semi-autonomous vehicles.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for validating automated or autonomous vehicle data transmission capabilities of a vehicle. In one exemplary embodiment, the methods may be performed by a vehicle data transmission diagnostics (VDTD) server.

In the exemplary embodiment, the vehicle data transmission diagnostics (VDTD) server may be in communication with a vehicle (e.g., a vehicle control system), one or more roadside evaluation units (REUs), one or more insurance network computer devices, one or more traffic lights (e.g., traffic light sensors), other roadside equipment, and/or one or more reference databases.

In the exemplary embodiment, the vehicle may be an autonomous or semi-autonomous vehicle that is part of a highly automated network of vehicles. The vehicle embarks on a trip along a route. The route may be defined by multiple waypoints at which the vehicle will pass through to reach its final destination. A network of roadside evaluation units (REUs) may be available for a geographic region that includes the route. In the REU network, multiple REUs may be available at different locations scattered within a geographic region.

In the exemplary embodiment, the REUs are configured to execute a data latency risk evaluation (DLRE) process conducted by the VDTD server. In particular, the REUs may be configured to receive instructions from the VDTD server as to a type of evaluation data packet (EDP) that needs to be transmitted to a specific vehicle. Accordingly, the REUs may be configured to transmit EDPs to vehicles and to receive transformed EDPs from vehicles. The transformed EDPs may be transmitted to the VDTD server for risk evaluation analysis.

A vehicle may be configured to receive an evaluation data packet (EDP) from an assigned REU (e.g., a selected REU), and to transmit a transformed EDP back to the assigned REU. In some embodiments, the selected REU may be configured to transmit the transformed EDP to the VDTD server. In some embodiments, the vehicle may transmit the transformed EDP to a different REU. The vehicle may be assigned to an REU by the VDTD server.

The EDP may be for specific diagnostic scenarios that assess factors, such as, data transmission speed between subsystems of a vehicle. For example, the evaluation data packet may analyze how different subsystems of a vehicle react and interact with one another in response to executing instructions contained in the evaluation data packet. Data as to speed, timeliness, and accuracy of computations performed by a vehicle control system of a vehicle in response to running the evaluation data packet may be transmitted back to a selected REU in the transformed EDP.

In the exemplary embodiment, the VDTD server determines that a DLRE needs to occur for a vehicle. The VDTD server may make this determination based upon a variety of factors, including available and/or downloaded software updates, approaching policy renewals, passage of time, miles driven, geographic region, driving environment, results of prior DLREs, driving patterns, and/or driving behavior. For example, the factors assessed by the VDTD server may depend on a passage of time between the most recent DLRE performed, and/or the most recent software update available/downloaded for a vehicle control system associated with the vehicle.

After determining that the vehicle needs a DLRE, the VDTD server may be configured to transmit a DLRE request to the vehicle. The DLRE request may request that the vehicle (specifically, the vehicle control system) provide a suitable time period and/or geographical region for the DLRE to occur. In some embodiments, the DLRE request may notify the vehicle that a DLRE process will occur during the next upcoming trip. The vehicle may queue the DLRE request for an upcoming trip. During the upcoming trip, the vehicle may transmit, to the VDTD server, a response message to the DLRE request.

The response message may include trip data, such as an origin/start point, an end point/destination, a selected route, such as the fastest route based upon current traffic and road conditions, and/or an estimated time of arrival. The response message may also include a vehicle identifier, such as a vehicle identification number (VIN). The response message may be transmitted to the VDTD server when the vehicle is at the origin point (before the trip begins).

In the exemplary embodiment, the VDTD server is configured to identify REUs along the selected route. The VDTD server may identify REUs near various geographical coordinates (e.g., waypoints) along the route. The VDTD server may assess the data transmission capabilities, the real-time data traffic flow, and/or the reception ranges of the available REUs to determine which REU should serve as a data latency evaluation checkpoint for the vehicle. The data latency evaluation checkpoint is an REU selected by the VDTD server (e.g., selected REU) to facilitate the DLRE process. In selecting an REU to serve as the data latency evaluation checkpoint, the VDTD server assesses a variety of factors.

For example, the VDTD server may monitor all the REUs within Chicago. In this example, the VDTD server may be in communication with each Chicago REU, and keep track of each data packet transmitted and received by the Chicago REUs. The VDTD server may analyze each transformed EDP received from the Chicago REUs to verify how fast the EDPs were transmitted by each REU, the speed at which the transformed EDPs were received by the REUs, and the accuracy of the data contained within the transformed EDPs. The VDTD server may be configured to receive and analyze, in real time, a large amount of transformed EDPs received from the Chicago REUs.

In this example, the VDTD server is configured to select a Chicago REU to serve as the data latency evaluation checkpoint for a particular vehicle driving in Chicago. The VDTD server may assess factors, such as the destination and route of this particular vehicle for a given trip, in determining which Chicago REU to select. Additionally, the VDTD server may consider the duration of the given trip, the destination (e.g., assess whether the vehicle is leaving Chicago and/or Illinois), the available REUs along the route, the reception ranges of each available REU, the data transmission capabilities of the vehicle, how long the VDTD server expects it will take for a transformed EDP to be received from the vehicle, and/or the speed at which the vehicle will travel for the trip.

In the exemplary embodiment, the VDTD server determines, based upon the route, an evaluation area. The DLRE process will occur within the evaluation area. The evaluation area encompasses at least a part of the route. In particular, the evaluation area may be a calculated area (e.g., based upon square mileage) that reflects optimal conditions for the DLRE process to occur for the vehicle based upon the trip data, and specifically, the selected route. The evaluation area may include a plurality of available REUs that are eligible to serve as the data latency evaluation checkpoint.

In some embodiments, the evaluation area may include only one available REU. In these embodiments, the one available REU is selected by the VDTD server to be the data latency evaluation checkpoint for the vehicle. In embodiments where multiple eligible REUs are available within the evaluation area, the VDTD server may randomly select one of the eligible REUs to serve as the data latency evaluation checkpoint. The VDTD server may instruct the selected REU that the vehicle will be within the evaluation area at a specific time.

The VDTD server may instruct the selected REU to transmit a specific EDP to the vehicle at a specific location. For example, the VDTD server may provide the selected REU with geographical coordinates as to the exact location at which the selected REU should transmit the EDP to the vehicle. In other embodiments, the selected REU may determine when and where to transmit the EDP to the vehicle once the vehicle is within the evaluation area.

In some embodiments, there may be a "handoff" from a REU selected to serve as the data latency evaluation checkpoint to another eligible REU within the evaluation area. For example, an assigned REU may be overloaded by the time the vehicle is within the evaluation area. In this example, the assigned REU may be processing a high volume of evaluation data packets for multiple vehicles due to, for example, a traffic accident.

In other embodiments, there may be a "handoff" from a selected REU to another REU outside of the evaluation area. For example, an unforeseen accident or holdup along route XYZ may affect the overall trip time and corresponding ETA. In these embodiments, the vehicle may recalculate and embark on a different route (e.g., a faster route) to avoid, for example, sitting in traffic, and to reach the destination in a timely manner. In these embodiments, the vehicle may transmit the recalculated trip data to the VDTD server, which in return, may determine a new evaluation area (based upon the recalculated trip data), and "handoff" the vehicle from the assigned REU to another REU along the new route.

Autonomous or semi-autonomous vehicles may pose a risk if the vehicle's data transmission capabilities are not transmitting and receiving data in an accurate and timely manner. If a vehicle is transmitting the wrong type of data and/or not receiving data from surrounding vehicles and infrastructure in a timely manner, the vehicle may not be able to efficiently communicate with nearby vehicles and respond quickly to avoid, for example, accidents.

If the vehicle is receiving data in a timely manner but not transmitting a response, the vehicle may crash or cause an accident, and thus pose a risk to the vehicle's occupants and to those individuals in surrounding vehicles. For example, the vehicle may receive command instructions from a central server (such as the VDTD server) to brake at an upcoming stop sign that is located in a busy intersection.

In this example where the data is not being processed in a timely manner, the vehicle may receive the command instructions from the central server, but not relay the instructions to the vehicle's subsystems. In this example, the vehicle poses a risk to nearby vehicles if the vehicle runs the stop sign. Accordingly, if a vehicle is not able to receive, process, and transmit data in an accurate and timely manner, the vehicle may pose a significant risk to the overall vehicle network.

Accordingly, the systems and methods described herein address at least these problems. Specifically, the systems and methods described herein may be implemented using computer programming or engineering techniques including computer software, firmware, hardware, or any combination or subset thereof, wherein the technical effects may be achieved by performing at least one of the following steps: (i) determining that a data latency risk evaluation (DLRE) should be performed on the vehicle; (ii) transmitting, to the vehicle, a data latency risk evaluation (DLRE) request to determine a time period and a geographical region for performing the DLRE; (iii) receiving, from the vehicle, a response to the transmitted DLRE request including trip data; (iv) interrogating the plurality of roadside evaluation units based upon the received trip data; and (v) selecting, based upon the interrogation, one of the plurality of roadside evaluation units to be a data latency evaluation checkpoint for the vehicle during the upcoming trip.

In the exemplary embodiment, the VDTD server instructs an REU to transmit an EDP to a vehicle so that the overall system (and subsystems) of the vehicle can be checked to evaluate whether all of the vehicle's subsystems are operating properly. Accordingly, the EDP may be used to determine whether the vehicle poses a low or high risk. In some embodiments, the VDTD server may directly transmit an EDP to a vehicle. In other embodiments, the VDTD server may transmit an EDP to the REU and subsequently instruct the REU to transmit the EDP to the vehicle. An EDP may be transmitted to the vehicle to determine whether data is being received by the vehicle in a timely manner, and/or whether data is being transmitted and received between the subsystems in a timely manner. Additionally or alternatively, an EDP may be transmitted to the vehicle to determine whether data is being properly processed.

Exemplary technical effects of the systems, methods, and computer-readable media described herein may include, for example: (i) enabling a data latency evaluation to be conducted for multiple vehicles in a geographic region; (ii) enabling a data latency evaluation to be conducted for a moving vehicle while it is traveling to its end destination; (iii) enabling multiple types of driving conditions to be evaluated while a vehicle is on the road by transmitting different types of evaluation data packets; (iv) accurately monitoring the data transmission capabilities of vehicles in real time; (v) detecting potential problems with a vehicle's data transmission capabilities to prevent automobile accidents and minimize automobile risks that may be presented the vehicle; (vi) improving the accuracy of insurance models (e.g., underwriting and/or actuarial models) used to make insurance decisions; (vii) continuously improving the accuracy of data used to make insurance decisions; and/or (viii) quantifying an automobile insurance risk posed by a vehicle based upon data packets transmitted by the vehicle.

Exemplary Vehicle Network

Figure 2:
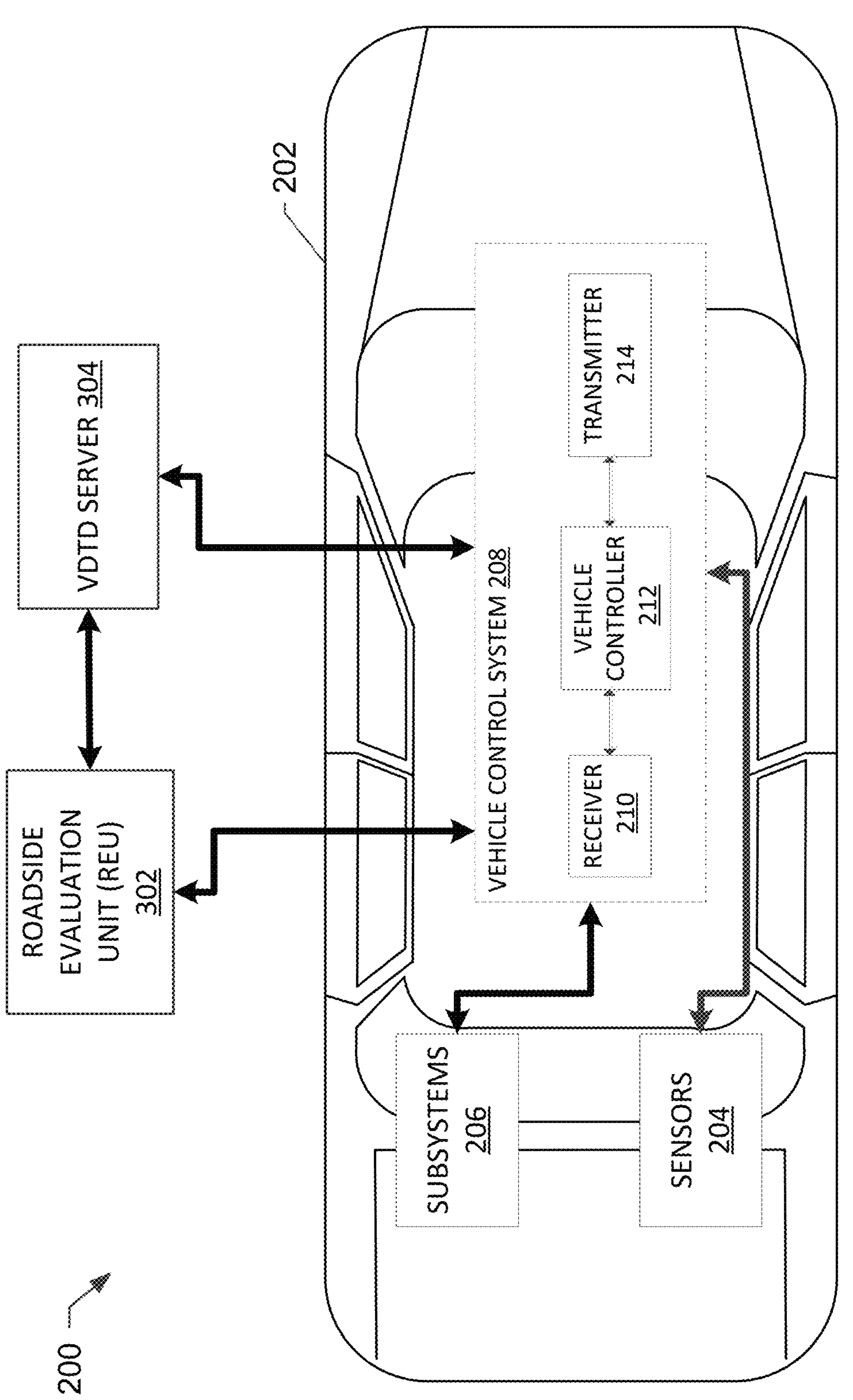
FIG. 2 illustrates a view of an exemplary vehicle in vehicle network (shown in FIG. 1)

FIG. 1 illustrates an exemplary vehicle network 100 of autonomous or semi-autonomous vehicles. FIG. 2 depicts a view 200 of an exemplary vehicle 202 in vehicle network 100 (shown in FIG. 1). Vehicle 202 is in communication with a roadside evaluation unit (REU) 302 and a vehicle data transmission diagnostics (VDTD) server 304 (both shown in FIG. 3). In the exemplary embodiment, and with combined reference with FIGS. 1 and 2, vehicles 102, 104, 106, and 108 of vehicle network 100 may be the same as or similar to exemplary vehicle 202.

In the exemplary embodiment, vehicle network 100 is a highly automated network of vehicles. As shown in FIG. 1, vehicle network 100 includes vehicles 102, 104, 106, 108 and traffic light 110. Vehicles 102, 104, 106, and 108 transmit vehicle telematics data (discussed below) to surrounding vehicles.

Traffic light 110 may be equipped with traffic light sensors (not shown) that enable traffic light 110 to transmit and receive traffic data that includes, but is not limited to, data relating to traffic signals, traffic signal cycle lengths, traffic control, pedestrian request signals, street lights, vehicle speeds, speed violations, traffic flow on roads controlled by traffic lights, intersection queue lengths, and vehicle accidents. The traffic light sensors may include, but are not limited to radar, LIDAR, Global Positioning System (GPS), video devices, imaging devices, cameras (e.g., 2D and 3D cameras), and audio recorders.

In vehicle network 100, vehicle 108 receives data from vehicles 102, 104, 106 as well as traffic light 110. Thus, vehicle 108 continuously receives data as to its surrounding environment and its nearby vehicles, and simultaneously transmits its own vehicle telematics data to vehicles 102, 104, 106 and traffic light 110. Accordingly, in vehicle network 100, vehicles, such as vehicles 102, 104, 106, 108 may receive and process a greater volume and variety of data as opposed to vehicles in vehicle networks consisting of mostly manually-operated vehicles.

As shown in FIG. 2, exemplary vehicle 202 is an autonomous or semi-autonomous vehicle capable of fulfilling the transportation capabilities of a traditional automobile or other vehicle. In these embodiments, exemplary vehicle 202 is capable of sensing its environment and navigating without human input. In some embodiments, exemplary vehicle 202 may include manual capabilities that enable a human driver to operate and control vehicle 202, essentially taking manual control of said autonomous or semi-autonomous vehicle 202. Exemplary vehicle 202 may include a plurality of sensors 204, subsystems 206, and a vehicle control system 208. Vehicle control system 208 may include a receiver (e.g., a receiver assembly) 210, a vehicle controller (e.g., a vehicle navigation and control system, "OVNCS") 212, and a transmitter (e.g., a transmitter assembly) 214. In the exemplary embodiment, vehicle control system 208 is in communication with roadside evaluation unit (REU) 302 and VDTD server 304. REU 302 may be a REU selected by VDTD server 304 to serve as a data latency evaluation checkpoint for vehicle 202 during a trip.

Sensors 204 may include, but are not limited to, radar, LIDAR, Global Positioning System (GPS), video devices, imaging devices, cameras (e.g., 2D and 3D cameras), and audio recorders. The plurality of sensors 204 may detect the current surroundings and location of exemplary vehicle 202. Specifically, sensors 204 may be configured to detect nearby/surrounding vehicles, such as a vehicle of oncoming and/or parallel traffic.

In the exemplary embodiment, sensors 204 are configured to monitor vehicle 202. Conditions of vehicle 202 detected by the plurality of sensors 204 may include telematics data or other variables, such as speed, acceleration, gear, braking, cornering, vehicle operation, and other conditions related to the operation of vehicle 202, for example: at least one of a measurement of at least one of speed, direction rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. The telematics data may also include a tread depth of one or more vehicle tires, an environmental sensor reading (e.g., temperature, humidity, acceleration), vehicle mileage, vehicle oil and fluid levels, tire pressure, tire temperature, vehicle brake pad thicknesses, gyroscope and accelerometer sensor information, GPS information, and the like.

Exemplary vehicle 202 includes subsystems 206 that are in communication with sensors 204 and vehicle control system 208. Subsystems 206 may include systems directed to steering/suspension, cooling, braking, axle/differential, engine performance, automatic transmission, drivetrain and axles, electrical/electronic systems, and climate control (e.g., heating and air conditioning). Subsystems 206 may have corresponding electronic control units that react, based upon signals received from vehicle control system 208, in a timely manner to operate vehicle 202.

As described above, vehicle control system 208 may include receiver 210, transmitter 214, and vehicle controller 212. Receiver 210 is configured to receive evaluation data packets (e.g., evaluation data packets) from REU 302. Receiver 210 is further configured to receive data from sensors 204 and subsystems 206. Receiver 210 may also receive instructions from vehicle controller 212. Receiver 210 may be configured to receive requests for data transmission checks (e.g., data transmission tests) from VDTD server 304. In the exemplary embodiment, transmitter 214 is configured to transmit data to REU 302 and VDTD server 304. For example, transmitter 214 may be configured to transmit vehicle telematics data, trip data, and computations and test results in response to received evaluation data packets.

In the exemplary embodiment, vehicle controller 212 may be configured to process evaluation data packets (EDPs) received from REU 302. In some embodiments, vehicle controller 212 may be configured to instruct subsystems 206 based upon instructions received in the evaluation data packets. In these embodiments, vehicle controller 212 may collect evaluation data from subsystems 206, such as response times associated with how long each subsystem 206 takes to execute instructions, and generate a response data packet (e.g., transformed evaluation data packet). The transformed evaluation data packet (TEDPs) may be transmitted to a selected roadside evaluation unit, such as REU 302. In further embodiments, vehicle controller 212 may process and interpret sensory information received from sensors 204.

In some embodiments, vehicle controller 212 may include a display screen or touchscreen (not shown) that is capable of receiving user input, such as, for example, trip data (e.g., trip destination), from a driver of vehicle 202. In other embodiments, vehicle controller 212 may be capable of wirelessly communicating with a user computer device (not shown) such as a mobile device (not shown) in vehicle 202. In these embodiments, vehicle controller 212 may be capable of communicating with the user of the mobile device, such as the driver, through an application of the mobile device.

In some embodiments, vehicle 202 may include autonomous or semi-autonomous vehicle-related functionality or technology that may be used with the present embodiments to replace human driver actions, and may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with host vehicle controller 212.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

While vehicle 202 may be an automobile in the exemplary embodiment, in other embodiments, vehicle 202 may be, but is not limited to, other types of ground craft, aircraft, and watercraft vehicles.

Exemplary Roadside Evaluation Unit Network

Figure 3:
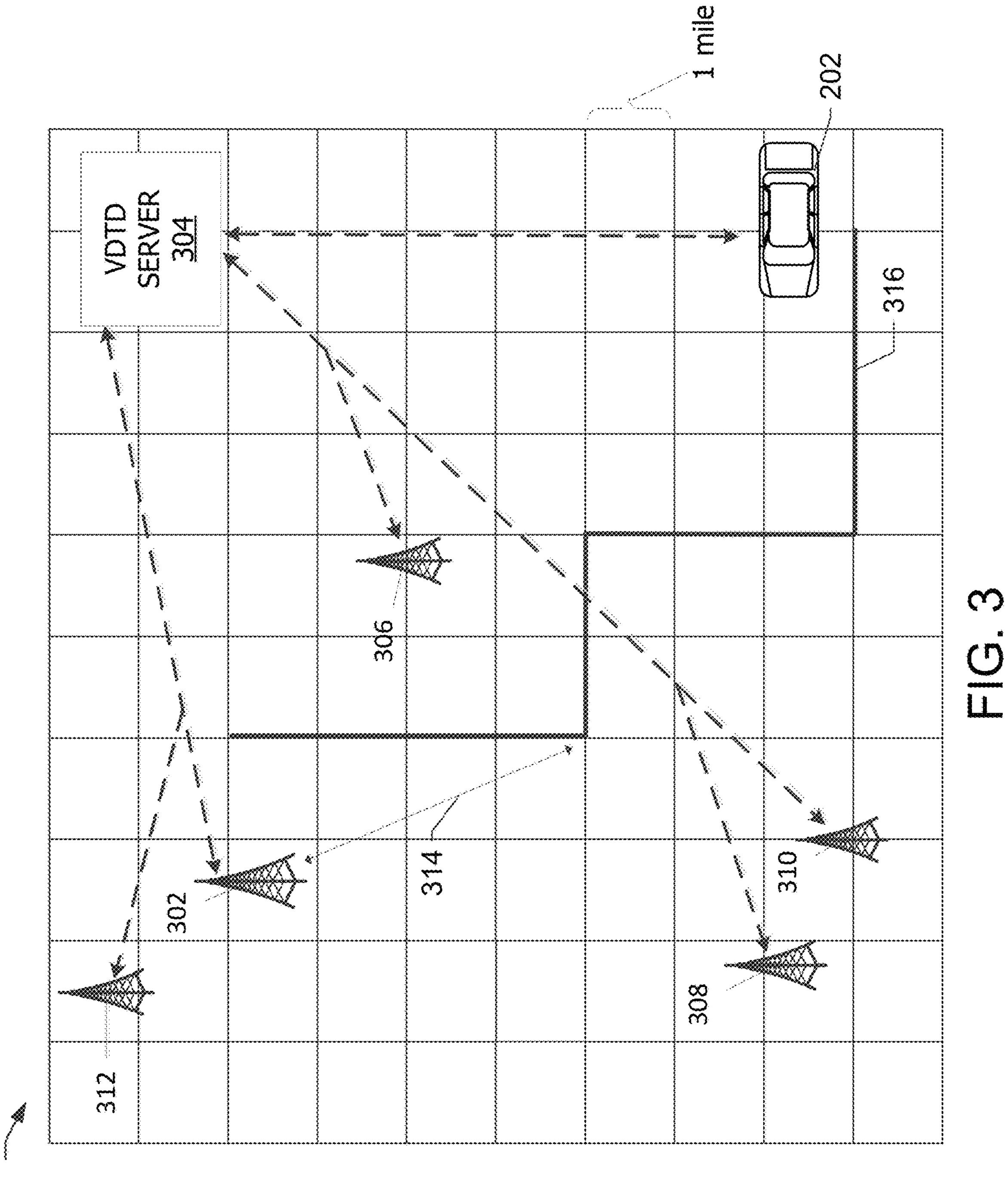
FIG. 3 illustrates a simplified diagram of a roadside evaluation unit (REU) network that includes a plurality of roadside evaluation units in communication with a VDTD server.

FIG. 3 illustrates a simplified diagram of a roadside evaluation unit (REU) network 300 including a plurality of roadside evaluation units (e.g., roadside equipment, "RSEs") in communication with VDTD server 304. In particular, REU network 300 includes REUs 302, 306, 308, 310, 312. In the exemplary embodiment, VDTD server 304 is also in communication with vehicle 202. Each REU 302, 306, 308, 310, 312 has a reception range 314, which is the range in which data can be transmitted and received by the corresponding REU. In particular, reception range 314 may refer to the distance between a specific REU and one or more objects (e.g., a vehicle, such as vehicle 202) in communication with the specific REU.

In REU network 300, REUs, such as REU 302, 306, 308, 310, 312 are positioned at various locations within a geographical region. REUs are configured to transmit evaluation data packets (EDPs) to vehicles, such as vehicle 202, and receive transformed evaluation data packets from vehicles in response. REUs may be located along a route 316 taken by vehicle 202. REUs refer to infrastructure-based connected objects that are capable of communicating with a broader transportation data network, such as vehicle network 100 (shown in FIG. 1). REUs may be configured to connect with multiple vehicles, such as vehicle 202. In particular, the REUs may be configured to communicate with multiple vehicle control systems (e.g., vehicle control system 208, shown in FIG. 2) to transmit and receive data. In the exemplary embodiment, REUs facilitate risk evaluation by transmitting evaluation data packets, and receiving transformed evaluation data packets from vehicles, such as vehicle 202. REUs may be configured to transmit the transformed evaluation data packets to VDTD server 304 to enable VDTD server 304 to evaluate the transformed evaluation data packets and quantify risk.

Exemplary Process for Selecting a Roadside Evaluation Unit

Figure 4:
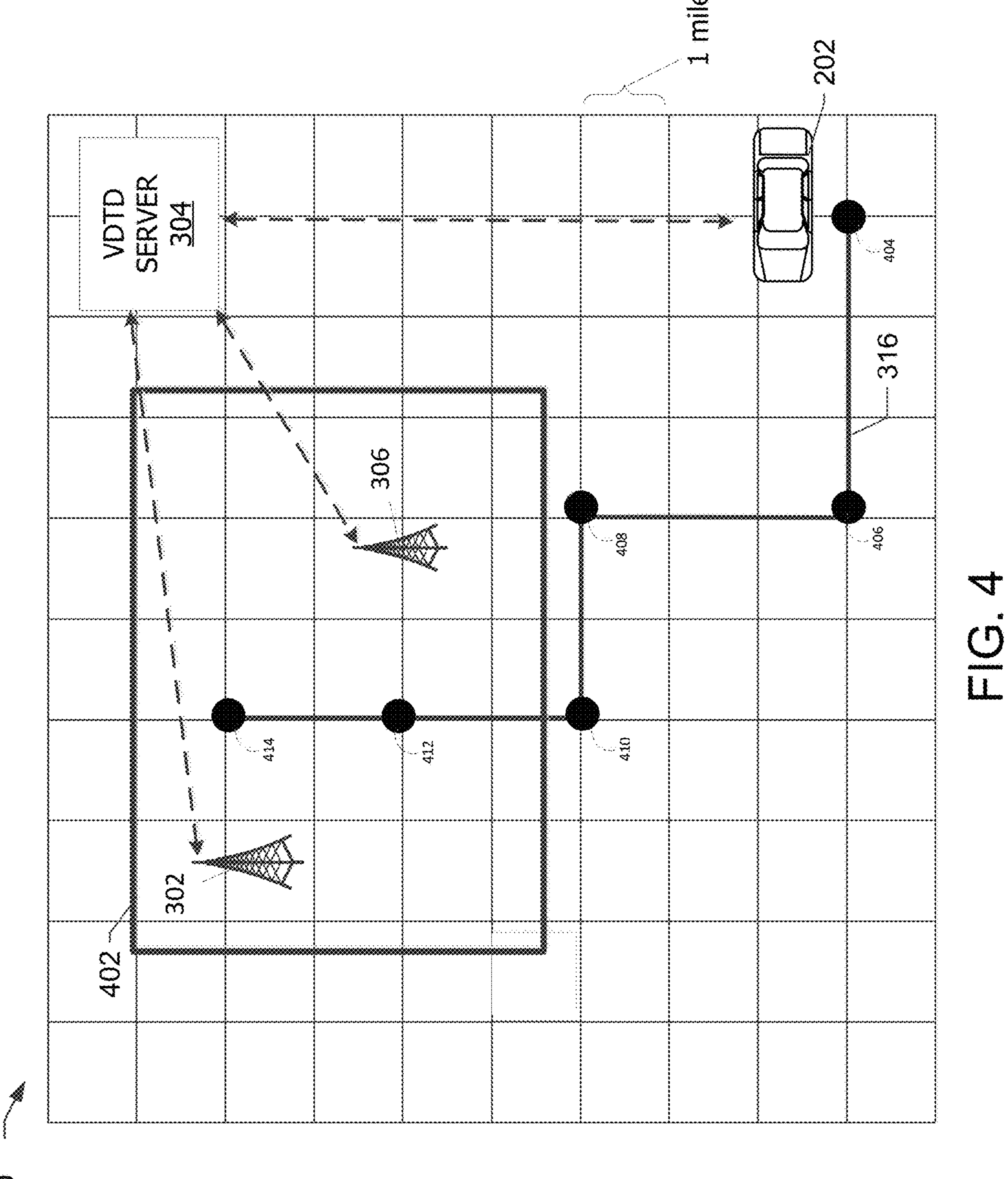
FIG. 4 illustrates an exemplary environment for selecting a roadside evaluation unit (REU), in accordance with one embodiment of the present disclosure.

FIG. 4 illustrates an exemplary environment 400 for selecting a roadside evaluation unit (REU), such as REUs 302 and 306. In particular, FIG. 4 illustrates an evaluation area 402 where the data latency evaluation will occur. Evaluation area 402 is determined by VDTD server 304.

Vehicle 202 embarks on a trip from origin 404 to destination (not shown). In the exemplary embodiment, the trip takes vehicle 202 along route 316. More specifically, the trip takes vehicle 202 along route 316 from origin 404 through waypoints 406, 408, 410, 412, 414 as vehicle 202 reaches its destination. As shown in FIG. 3, REUs, such as REU 302, 306, 308, 310, 312 may be available at multiple locations in a geographic region that encompasses route 316. In some embodiments, vehicle 202 may receive an evaluation data packet (EDP) from a selected REU and transmit a transformed evaluation data packet to a different REU available along route 316. In other embodiments, vehicle 202 may communicate back and forth with only one REU (e.g., receive and transmit data packets with a single REU).

In the exemplary embodiment, and with combined reference with FIGS. 3 and 4, VDTD server 304 determines, based upon one or more factors, that a data latency risk evaluation (DLRE) needs to occur for vehicle 202. Factors may include available and/or downloaded software updates, approaching policy renewals, passage of time, miles driven, geographic region, driving environment, results of prior DLREs, driving patterns, and/or driving behavior. For example, the factors assessed by VDTD server 304 may depend on a passage of time between the most recent DLRE performed and/or the most recent software update available/downloaded for vehicle control system 208 (shown in FIG. 2). VDTD server 304 may determine, while vehicle 202 is on a trip, that vehicle 202 needs a DLRE.

In some embodiments, VDTD server 304 may continuously assess the factors described above each time vehicle 202 takes a trip. VDTD server 304 may determine that vehicle 202 needs a DLRE the next time vehicle 202 embarks on a trip. In other embodiments, VDTD server 304 may determine that a DLRE is required immediately. In certain embodiments, VDTD server 304 may determine that a DLRE must be performed by a designated time frame (e.g., within the next week) and/or within a certain number of miles (e.g., within 100 miles).

In the exemplary embodiment, VDTD server 304 pings vehicle 202 (e.g., specifically, vehicle control system 208) to identify a suitable time period and/or geographical region for the DLRE to occur. For example, in the DLRE request, VDTD server 304 may notify vehicle 202 that a DLRE needs to occur within a certain time frame and/or during the next trip. In the exemplary embodiment, vehicle 202 queues the DLRE request for the next trip vehicle 202 takes. In some embodiments, VDTD server 304 may enable vehicle 202 and/or the driver of vehicle 202 to schedule when and where the DLRE should be performed. In other embodiments, a DLRE is automatically queued for the next trip vehicle 202 takes.

In the exemplary embodiment, the next time vehicle 202 embarks on a trip, vehicle 202 selects a route, such as route 316. Vehicle 202 may select route 316 while at origin 404. For example, the driver may input a destination into a display screen or a touchscreen (not shown) of vehicle 202 while at origin 404. Vehicle control system 208 may transmit trip data associated with route 316 to VDTD server 304 before vehicle 202 embarks on the trip.

VDTD server 304 may identify REUs along route 316. For example, VDTD server 304 may identify REUs along waypoints 406, 408, 410, 412, 414 to determine which REUs can serve as a data latency evaluation checkpoint for vehicle 202 during the trip along route 316. The data latency evaluation checkpoint refers to a REU selected by VDTD server 304 to perform a data latency evaluation for vehicle 202 during the trip along route 316. VDTD server 304 determines evaluation area 402 based upon trip data received from vehicle 202. Evaluation area 402 may include one or more REUs that can serve as the data latency checkpoint (e.g., that can perform the data latency evaluation).

In the exemplary embodiment, evaluation area 402 includes REUs 302 and 306. Either one of REU 302 or 306 may serve as the data latency checkpoint for vehicle 202. With combined reference to FIGS. 3 and 4, REUs 308, 310, and 312, as shown in FIG. 3, are excluded from evaluation area 402 because they are far from route 316.

As discussed above, each REU has a reception range, such as reception range 314 (shown in FIG. 3). Factors, such as reception range, network connectivity, bandwidth, real-time data capacity, and data transmission and reception capabilities of each available REU may be taken into account when determining which REU to select as the data latency checkpoint for a vehicle, such as vehicle 202. In further embodiments, factors, such as the data capabilities of vehicle 202, an estimated time of arrival (ETA), the estimated amount of data to be transmitted in the evaluation data packet, the estimated amount of data to be received in the transformed evaluation data packet, traffic (e.g., morning/afternoon rush hour), road closures, and inclement weather may be taken into consideration by VDTD server 304 to determine which REU should serve as the data latency checkpoint for the trip by vehicle 202 along route 316.

In some embodiments, VDTD server 304 calculates the reception range (and reception strength) between each available REU and its nearby waypoints. In these embodiments, VDTD server 304 may determine that REUs with the strongest reception strength along route 316 are eligible REUs.

In certain embodiments, vehicle 202 may have a stronger network connectivity with one eligible REU but not another eligible REU based upon the data transmission capabilities of vehicle 202. For example, vehicle 202 may be an older model that has not been updated with software updates in a number of years. In these embodiments, some REUs may be more compatible with older models than other REUs.

In the exemplary embodiment, VDTD server 304 randomly selects one of the two eligible REUs 302, 306 to serve as the data latency checkpoint for vehicle 202. In the exemplary embodiment, REU 302 is randomly selected to be the data latency evaluation checkpoint (e.g., standard data transmission location, "SDTL"). Accordingly, vehicle 202 is assigned to REU 302 for the DLRE for the trip by vehicle 202 along route 316. In some embodiments, there may be only one REU within evaluation area 402 that is eligible to serve as the data latency evaluation checkpoint for vehicle 202 during a trip along route 316.

In other embodiments, there may be multiple eligible REUs from which VDTD server 304 may choose as the data latency checkpoint for a trip along route 316. In these embodiments, VDTD server 304 may randomly select one of the eligible REUs to serve as the data latency checkpoint.

In some embodiments, there may be a "handoff" from an assigned REU, such as REU 302, to another eligible REU, such as REU 306. For example, an assigned REU may be overloaded by the time vehicle 202 is within evaluation area 402. In this example, the assigned REU may be processing a high volume of evaluation data packets for multiple vehicles due to, for example, a traffic accident. In another example, an unforeseen accident or holdup along route 316 may affect the overall trip time and corresponding ETA. In these embodiments, vehicle 202 may recalculate and embark on a different route (e.g., a faster route) to avoid, for example, sitting in traffic, and to reach the destination in a timely manner. In these embodiments, vehicle 202 may transmit the recalculated trip data to VDTD server 304, which in return, may "handoff" vehicle 202 from the assigned REU to a new REU along the new route.

Exemplary Data Latency Evaluation

Figure 5:
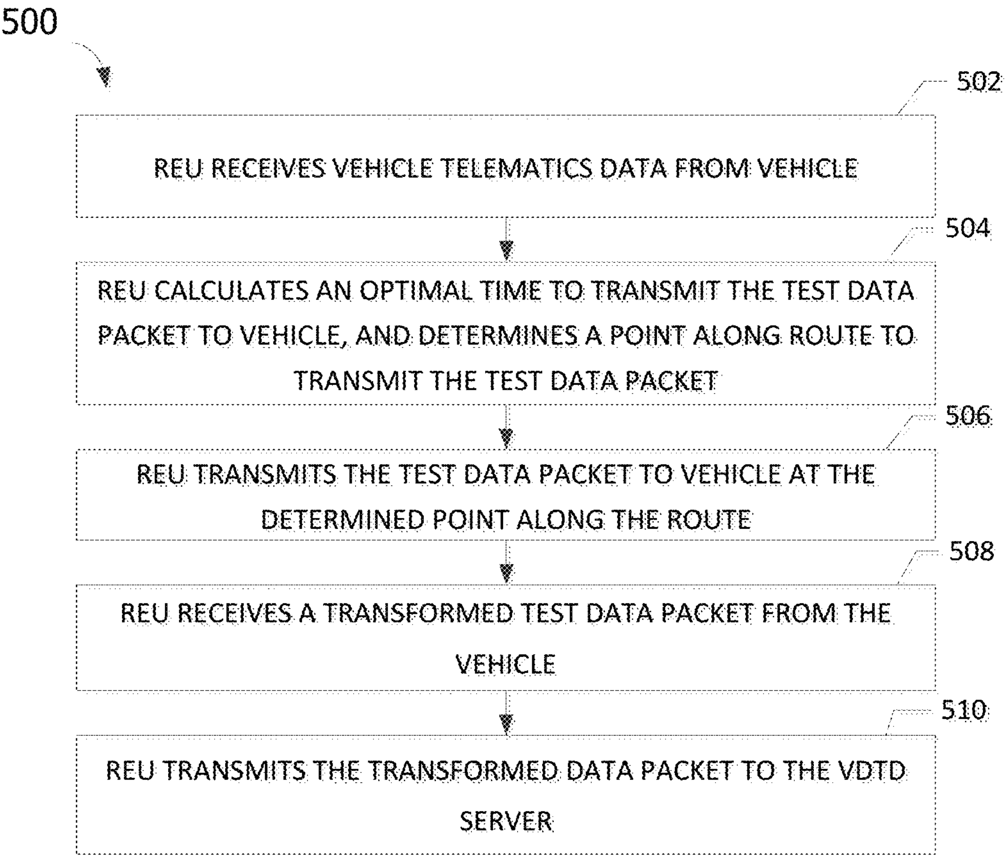
FIG. 5 illustrates an exemplary process for performing a data latency evaluation, in accordance with one embodiment of the present disclosure.

FIG. 5 illustrates an exemplary process 500 for performing a data latency evaluation. In particular, exemplary process 500 illustrates the data latency evaluation process between the selected REU (e.g., the assigned REU), such as REU 302, and vehicle, such as vehicle 202 (both shown in FIG. 4). In the exemplary embodiment, with combined reference to FIGS. 1-5, vehicle 202 transmits vehicle telematics data (e.g., vehicle kinematics data) to surrounding vehicles, VDTD server 304, and REUs, such as REU 302, 306, 308, 310, 312 when vehicle 202 embarks on route 316.

Upon entering a reception range 314 of REU 302, REU 302 receives vehicle telematics data from vehicle 202 (step 502). REU calculates an optimal time to transmit an evaluation data packet to vehicle 202, and determines a waypoint along route 316 to transmit the evaluation data packet to vehicle 202 (step 504). REU 302 may calculate the optimal time to transmit the evaluation data packet based upon the vehicle telematics data received from vehicle 202. The optimal time and point (e.g., waypoint) at which the evaluation data packet should be sent may be calculated based upon, for example, an estimated speed and heading of vehicle 202, traffic data/traffic signals received from traffic lights (e.g., traffic lights 110, shown in FIG. 1), security factors, and/or compensations for the Doppler Effect.

In the exemplary embodiment, selected REU 302 transmits the evaluation data packet to vehicle 202 when vehicle 202 is at waypoint 412 along route 316 (step 506). Vehicle 202 (specifically vehicle control system 208, shown in FIG. 2) processes the evaluation data packet and transmits a transformed data packet to selected REU 302 when vehicle 202 is at waypoint 414. The evaluation data packet may be for specific diagnostic scenarios that assess factors, such as, data transmission speed between subsystems 206 (shown in FIG. 2) of vehicle 202. For example, the evaluation data packet may analyze how different subsystems 206 of vehicle 202 react and interact with one another in response to executing instructions contained in the evaluation data packet. Data as to speed, timeliness, and accuracy of computations performed by vehicle control system 208 in response to running the evaluation data packet may be transmitted back to selected REU 302 in the transformed evaluation data packet.

Selected REU 302 may receive the transformed evaluation data packet from vehicle 202 (step 508), and may transmit the transformed evaluation data packet to VDTD server 304 (step 510). VDTD server 304 may assess the transformed evaluation data packet to determine whether the speed of the data transmission, the speed of the entire data latency evaluation process, and the computations performed by vehicle control system 208 indicate that vehicle 202 poses a high or low risk. In some embodiments, VDTD server 304 may compare the volume of data in the original evaluation data packet transmitted to vehicle 202 with the volume of data in the transformed evaluation data packet to evaluate the accuracy of the data contained in the transformed evaluation data packet. In certain embodiments, selected REU 302 may analyze the transformed evaluation data packet in order to quantify the risk before transmitting the transformed evaluation data packet to VDTD server 304. In other embodiments, data analysis as to the transformed evaluation data packet may be performed by both selected REU 302 and VDTD server 304.

Figure 6:
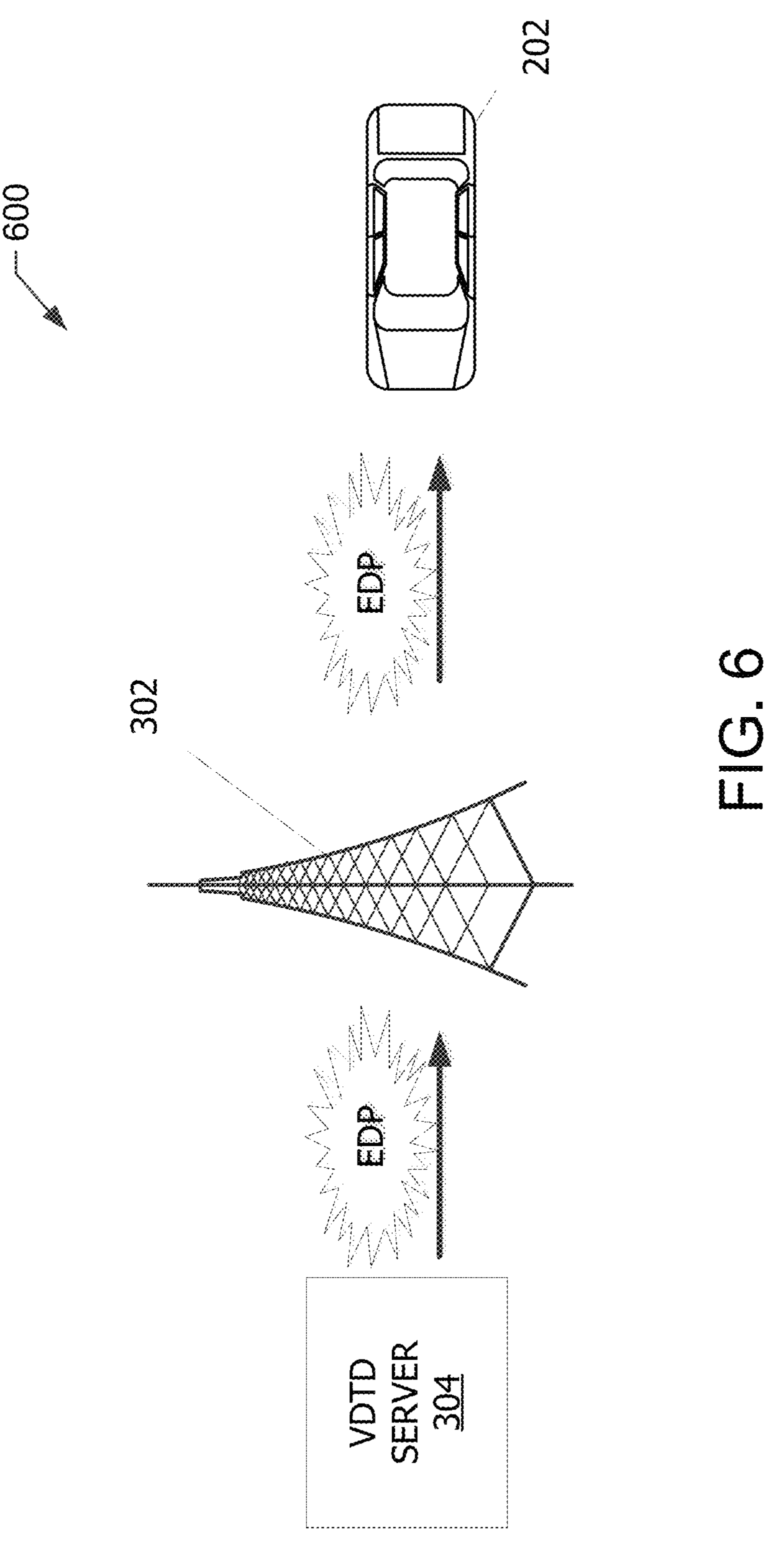
FIG. 6 illustrates a data flow of an exemplary data transmission process for an evaluation data packet (EDP) from a selected REU to a vehicle, in accordance with one embodiment of the present disclosure.

FIG. 6 illustrates a data flow of an exemplary data transmission process 600 for an evaluation data packet (EDP) from a selected REU, such as REU 302, to a vehicle, such as vehicle 202 (both shown in FIG. 4). The EDP may include instructions to vehicle 202 on what diagnostic tests to execute.

In some embodiments, the EDP may include a simulation model for execution. The EDP may also include a payload for simulation. The payload may include, for example, a scenario, a simulation model, simulation parameters (e.g., obstacles, timing of events, etc.). The EDP may be generated by VDTD server 304 and transmitted directly to vehicle control system 208 (shown in FIG. 2) via selected REU 302. In other embodiments, the EDP may be generated by selected REU 302.

In some embodiments, vehicle control system 208 performs a self-diagnostic evaluation using a default EDP stored in a memory on vehicle 202. Alternatively, the EDP may have been previously received and stored on vehicle 202. For example, a default EDP may be stored in a non-volatile or read-only memory ("ROM") location. In geographic locations where REUs are scarce or not available, the default EDP may be retrieved from the stored memory for use.

In the exemplary embodiment, the EDP includes instructions to perform a test of the communication systems. The EDP may also include test data that may be used to perform testing of the communications systems. For example, the EDP may include instructions to test a receiver assembly, such as receiver 210 (shown in FIG. 2). The test data may be transmitted to receiver 210. The test data may then be measured after reception by receiver 210. In some embodiments, the EDP may include instructions and test data to simulate different scenarios. For example, the EDP may include instructions to simulate an obstacle (e.g., other vehicles, pedestrians, etc.) and evaluate the response by vehicle 202.

Figure 7:
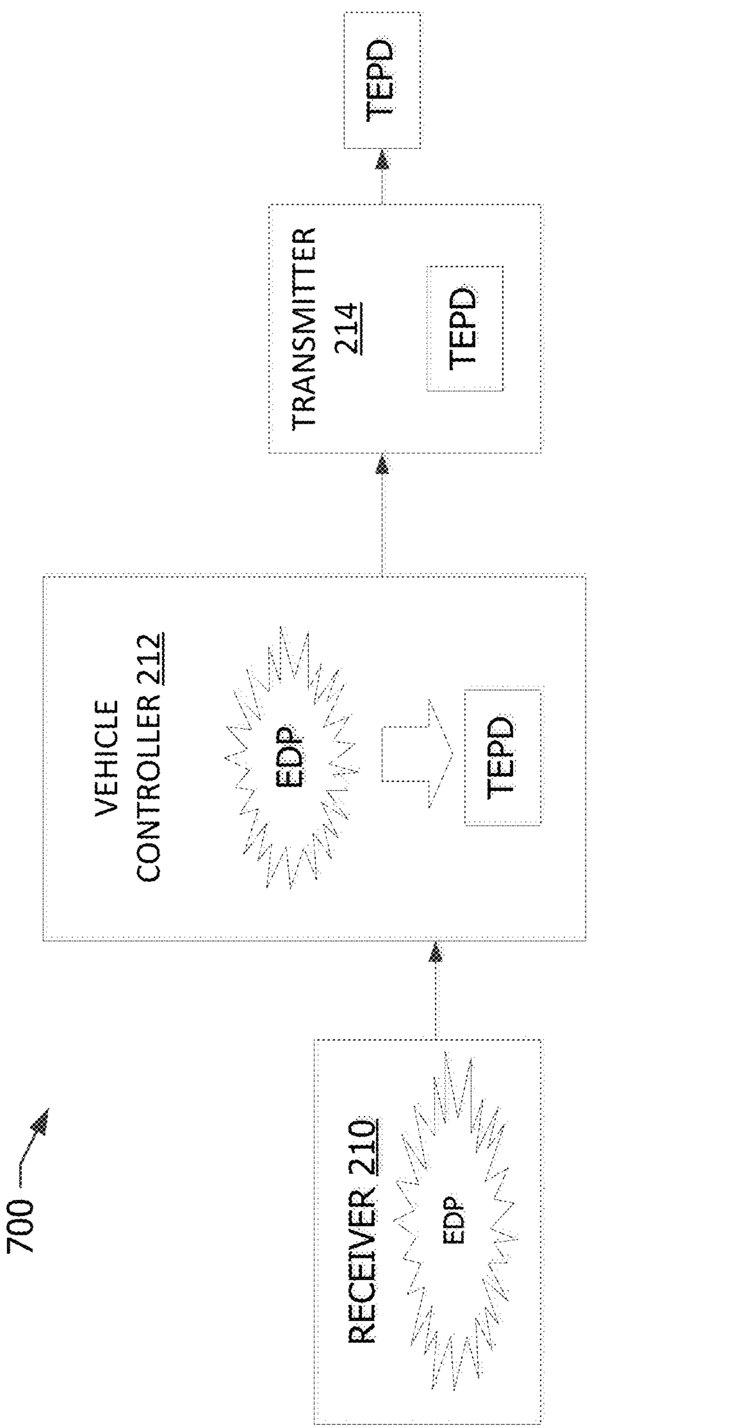
FIG. 7 illustrates a data flow diagram for the transformation of an evaluation data packet (EDP) by a vehicle control system (shown in FIG. 2), in accordance with one aspect of the present disclosure.

FIG. 7 illustrates a data flow diagram 700 for the transformation of an evaluation data packet (EDP) by vehicle control system 208 (shown in FIG. 2), in accordance with one aspect of the present disclosure. In the exemplary embodiment, receiver 210 of vehicle control system 208 receives the EDP, and transmits the received EDP to vehicle controller 212. Vehicle controller 212 may transform the received EDP into a transformed EDP. In some embodiments, vehicle controller 212 may transmit the transformed EDP to transmitter 214. Transmitter 214 may transmit the transformed EDP to an external source, such as selected REU 302 (shown in FIG. 3).

Vehicle controller 212 executes the EDP and generates a transformed EDP for transmission to selected REU 302 by implementing an evaluation process. The evaluation process may include a mathematical calculation or sets of sample calculations by subsystems and/or electronic components of vehicle 202. The mathematical calculations may, for example, be estimations or summation of commands issued by vehicle controller 212.

In the exemplary embodiment, the evaluation process may include evaluation of transmission and reception capabilities including signal strength evaluation, detection of errors in data, and accuracy assessments. In some embodiments, the evaluations may include analyzing response times of subsystems, such as subsystems 206 (shown in FIG. 2). For example, a steering command issued may have a measurable response time before the steering system is able to complete execution of the command. In some embodiments, subsystems 206 may be in communication with other components and/or other subsystems. Evaluation of communication times between subsystems 206 may be included in the evaluation process. In some embodiments, the communication analysis may further include degradation of transmission and reception signals, error detection, and/or signal processing and/or transformation and performance analysis.

In the exemplary embodiment, the evaluation process includes the combination of response times between reception of EDP, decoding of EDP, execution of diagnostic tests including activation of identified subsystems and the response of the subsystems, compilation of results, combining and/or transforming of EDP with results to generate a transformed EDP, and transmitting the transformed EDP to selected REU 302. In some embodiments, the evaluation process may include communication with other, external systems such as other vehicles, traffic systems, weather information systems, and/or other emergency alert systems.

In some embodiments, the evaluation process includes a simulation or generation of virtual obstacles and determination of response times to the virtual obstacles or simulated scenarios. For example, a virtual pedestrian engaging in a sudden movement interrupting a pre-determined or previously computed navigational path may be generated. A simulation of the movement of the virtual pedestrian may be executed to determine a sample set of response by control systems of vehicle 202.

Figure 8:
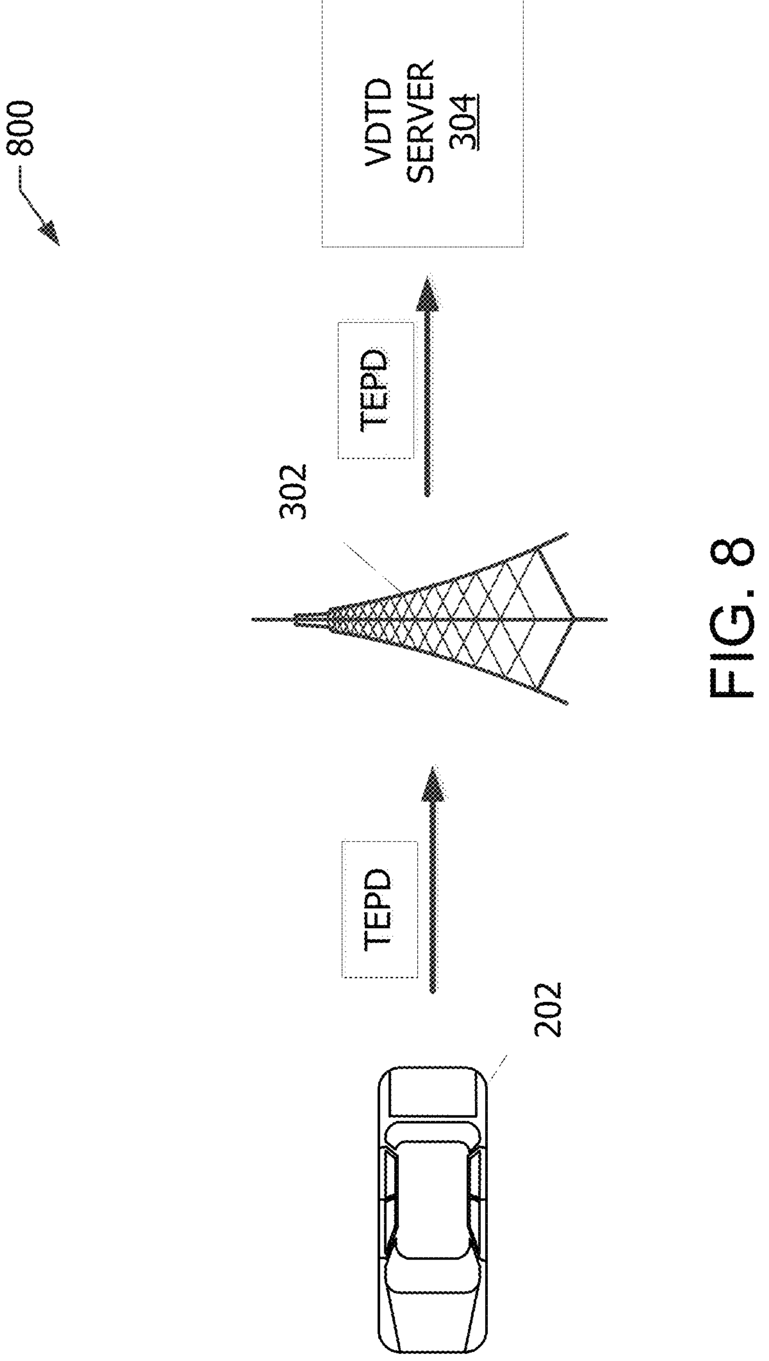
FIG. 8 illustrates an exemplary data flow diagram from the transmission of a transformed evaluation data packet from the vehicle to the VDTD server (shown in FIG. 2)

FIG. 8 illustrates an exemplary data flow diagram 800 from the transmission of the transformed evaluation data packet from vehicle 202 (specifically, vehicle control system 208, shown in FIG. 2) to VDTD server 304 (shown in FIG. 2). In the exemplary embodiment, the transformed EDP is transmitted from vehicle 202 to selected REU 302 (shown in FIG. 3). Vehicle 202 may utilize transmitter 214 (shown in FIG. 2) to transmit the transformed EDP. Selected REU 302 transmits the transformed EDP to VDTD server 304. In some embodiments, selected REU 302 may transmit the transformed EDP in real time. In other embodiments, selected REU 302 may transmit the transformed EDP at a designated time period.

Exemplary Computer System

Figure 9:
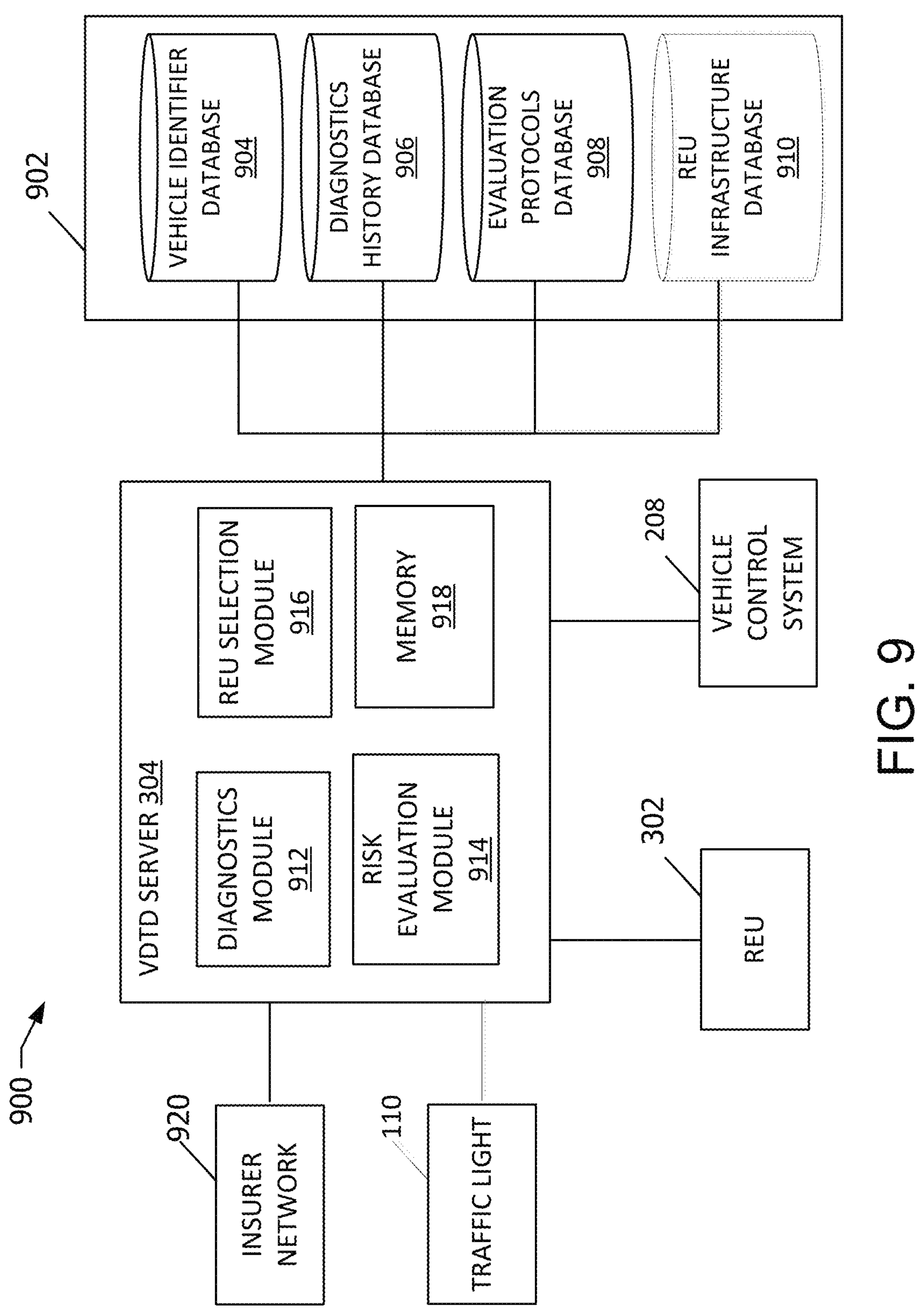
FIG. 9 illustrates a simplified block diagram of an exemplary computer system for implementing a computer-implemented process (shown in FIG. 12)
Figure 12:
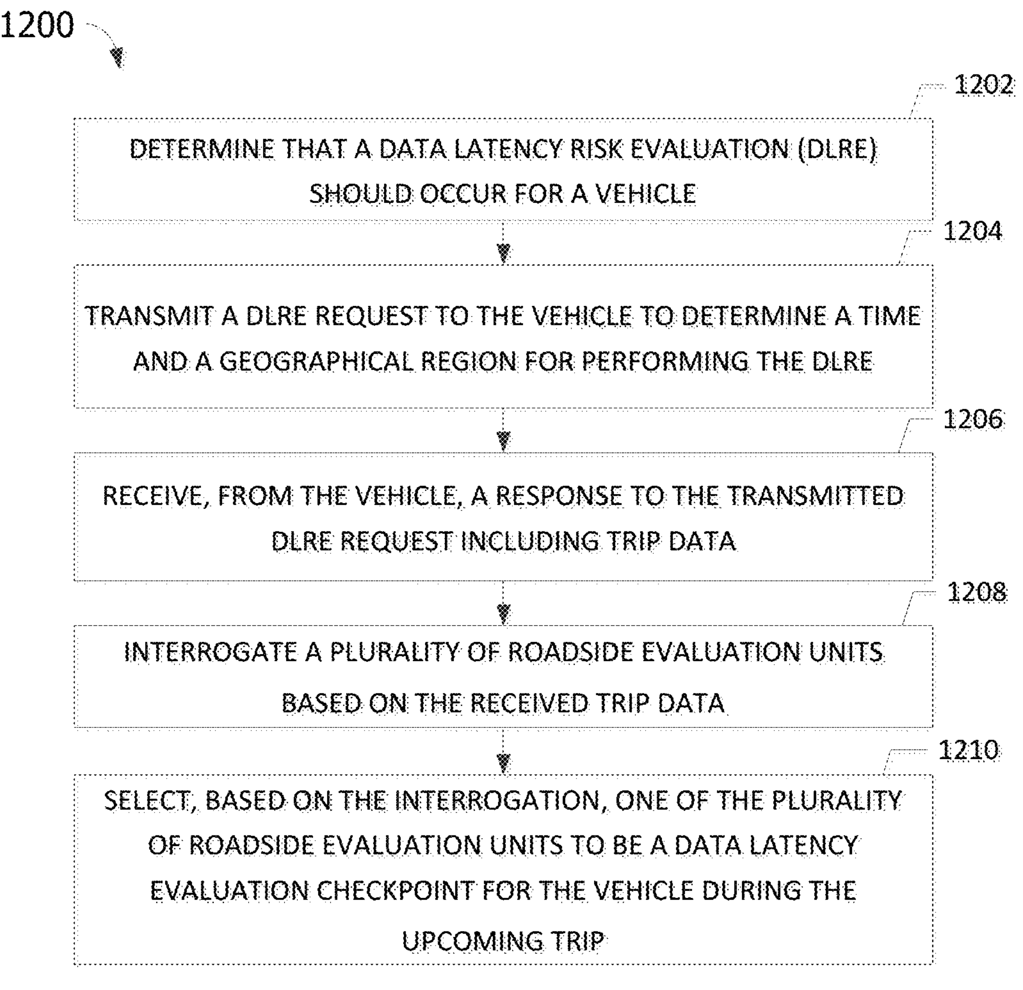
FIG. 12 illustrates a flow chart of an exemplary computer-implemented process for one aspect of selecting a roadside evaluation unit (REU) to serve as a data latency evaluation checkpoint for a vehicle, in accordance with one embodiment of the present disclosure.

FIG. 9 depicts a simplified block diagram of an exemplary computer system 900 for implementing a computer-implemented process 1200 shown in FIG. 12. In the exemplary embodiment, computer system 900 includes VDTD server 304 in communication with insurer network 920, selected REU 302, vehicle control system 208, and reference databases 902. In addition to selected REU 302, VDTD server 304 may also be in communication with other REUs of REU network 300, such as REU 306, 308, 310, 312 (shown in FIG. 3). Reference databases 902 include a vehicle identifier database 904, a diagnostics history database 906, an evaluation protocols database 908, and a roadside evaluation unit (REU) infrastructure database 910. VDTD server (e.g., VDTD computing device) 304 includes a diagnostics module 912, a risk evaluation module 914, an REU selection module 916, and a memory 918.

VDTD server 304 may be configured to receive vehicle telematics data from vehicle control system 208. In further embodiments, VDTD server 304 may be configured to receive vehicle telematics data from a plurality of vehicle control systems 208. VDTD server 304 may retrieve vehicle data from vehicle identifier database 904 using vehicle identification information received from vehicle control system 208.

In some embodiments, vehicle control system 208 may transmit a vehicle identifier, such as a vehicle identification number (VIN) to surrounding vehicles and VDTD server 304 each time vehicle 202 (shown in FIG. 2) embarks on a trip. For example, the vehicle telematics data transmitted from vehicle control system 208 may include a vehicle identifier. In these embodiments, VDTD server 304 may utilize the vehicle identifier to retrieve vehicle information from vehicle identifier database 904. VDTD server 304 may retrieve, for example, a vehicle history report associated with vehicle 202 from vehicle identifier database 904. VDTD server 304 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

VDTD server 304 may further retrieve past data latency risk evaluation records associated with vehicle 202 from diagnostics history database 906. VDTD server 304 may access these records to determine the current operational state of vehicle 202 (e.g., data transmission and reception capabilities, network connectivity capabilities), when the next DLRE request should be sent to vehicle control system 208, and the type of evaluation data packet that should be transmitted to vehicle control system 208. For example, based upon these records, VDTD server 304 may determine that an evaluation data packet simulating traffic stops in a congested area should be transmitted to vehicle control system 208 to assess the response times of the steering and braking subsystems (as well as the corresponding electronic control units) of vehicle 202.

VDTD server 304 may be configured to reference protocols stored in evaluation protocols database 908. Protocols stored in evaluation protocols database 908 may include vehicle network protocols, data transmission protocols, vehicle operation protocols associated with a make and model corresponding to vehicle 202, and protocols associated with REUs of REU network 300 (shown in FIG. 3). For example, VDTD server 304 may reference a vehicle operation protocol associated with vehicle 202 to determine the optimal threshold and data transmission/reception capabilities of vehicle 202. In this example, VDTD server 304 may compare the data received in a transformed evaluation data packet to optimal thresholds and performance capabilities for vehicle 202 to determine whether or not vehicle 202 poses a high risk, low risk, or no risk.

VDTD server 304 may further retrieve, from REU infrastructure database 910, infrastructure data associated with REUs as well as REU infrastructure maps for a geographic location. Infrastructure data may include data as to the number of REUs in a given geographic location, the location coordinates associated with each REU, the data processing capabilities of each REU, the bandwidth of each REU, as well as performance data associated with each REU (e.g., information as to network connectivity problems, lags/delays, data packet loss).

In the exemplary embodiment, diagnostics module 912 of VDTD server 304 may utilize vehicle telematics data (such as speed, location, acceleration, deceleration, heading, direction, route, braking, cornering, and/or other data) received from vehicle control system 208 as well as data from reference databases 902 to determine when a request for a DLRE should be transmitted to vehicle control system 208. Diagnostics module 912 may determine which type of evaluation data packet needs to be transmitted by selected REU 302 to vehicle 202 during the data latency evaluation process.

REU selection module 916 may utilize trip data received from vehicle control system 208, and may additionally reference an REU infrastructure map retrieved from REU infrastructure database 910 to determine which REU should be selected as the data latency checkpoint for vehicle 202 during a trip along route 316 (shown in FIG. 3). Diagnostics module 912 may also be configured to receive traffic data from traffic light sensors associated with a traffic light, such as traffic light 110 (shown in FIG. 1) to determine which eligible REU should be chosen as the data latency checkpoint for the trip.

VDTD server 304 may be configured to communicate with selected REU 302 to receive a transformed evaluation data packet from selected REU 302. Risk evaluation module 914 of VDTD server 304 may be configured to analyze the data in the transformed evaluation data packet to determine whether vehicle 202 poses a risk. For example, risk evaluation module 914 may retrieve baseline data, such as optimal transmission and reception speeds, from evaluation protocols database 908 and compared the transformation evaluation data packet to the baseline data.

VDTD server 304 may be configured to store a risk evaluation record (not shown) associated with the DLRE in memory 918. Memory 918 may include a database server (not shown) that is communicatively coupled to a database (not shown) that stores data. Memory 918 may further include models, generated from baseline data, such as optimal data transmission thresholds, retrieved from evaluation protocols database 908. Additionally or alternatively, memory 918 may include trip data and vehicle telematics data received from vehicle control system 208. Trip data may include routes (e.g., origin point, end point) as well as evaluation areas, such as evaluation area 402 (shown in FIG. 4) generated by VDTD server 304.

In some embodiments, VDTD server 304 may be associated with, or part of a computer network associated with an insurance provider, such as insurer network 920. In other embodiments, VDTD server 304 may be in communication with insurer network 920 computer devices. VDTD server 304 may be configured to transmit risk evaluation records to insurer network 920. Computer devices of insurer network 920 may access risk evaluation records to update and/or adjust an insurance policy of an insurance policy holder. In some embodiments, risk evaluation records may be used to update and/or create an underwriting model and/or an actuarial model to determine whether different types of risk are dependent on a driver, the vehicle control system, software updates, different data types received by a vehicle, the volume of data received by the vehicle, and/or system failures in a geographic location (e.g., problems with a network of REUs in a given geographic location). In certain embodiments, computer devices of vehicle manufacturers (not shown) may be in communication with VDTD server 304 to access and utilize risk evaluation records generated by VDTD server 304 to assess vehicle performance.

Figure 10:
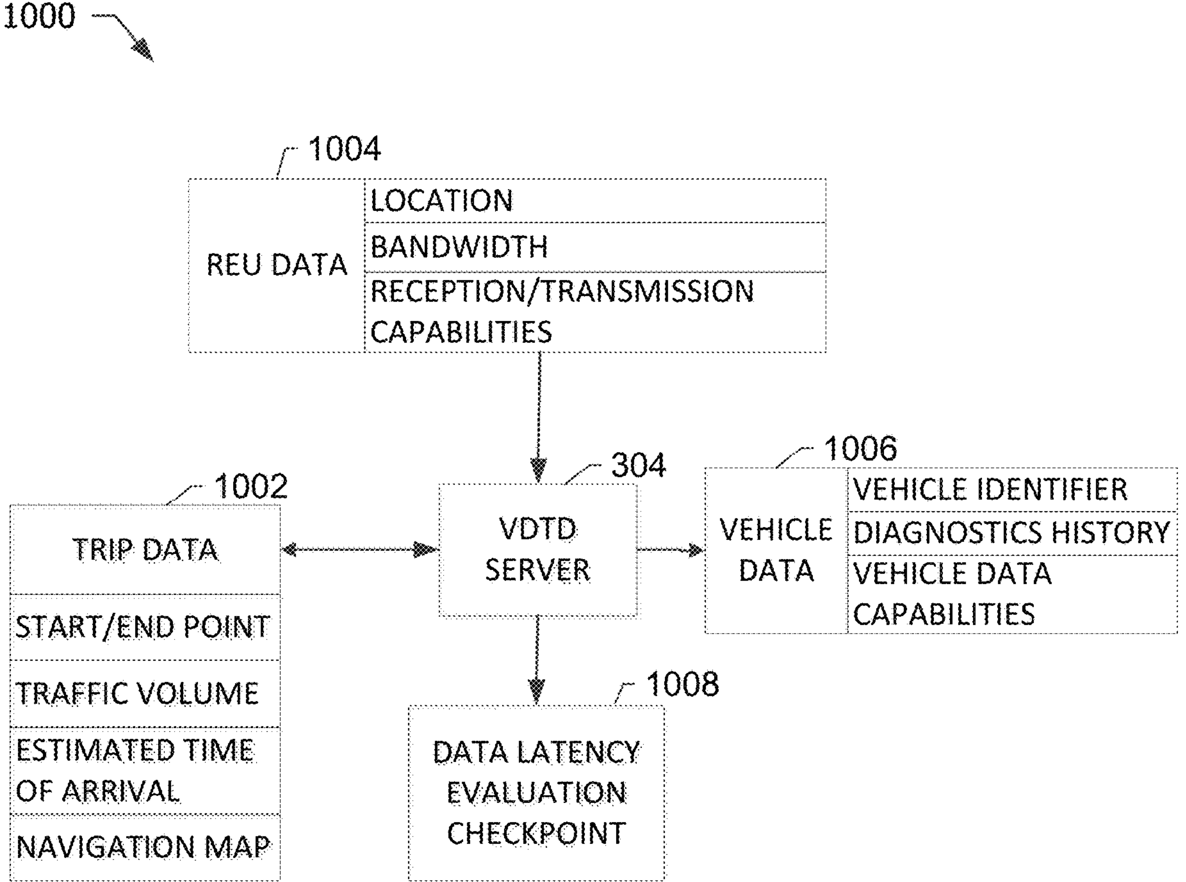
FIG. 10 illustrates a simplified block diagram of an exemplary process using the VDTD server to select a roadside evaluation unit (REU) for a trip by the vehicle along a selected route, in accordance with one embodiment of the present disclosure.

Exemplary Data Conversion Process to Select a Data Latency Evaluation Checkpoint FIG. 10 is a simplified block diagram 1000 of an exemplary process using VDTD server 304 to select a roadside evaluation unit (REU), such as REU 302 for a trip by vehicle 202 along route 316 (all shown in FIG. 3). In the exemplary embodiment, diagram 1000 includes VDTD server 304, trip data 1002, REU data 1004, and vehicle data 1006. VDTD server 304 may be configured to select a REU as a data latency evaluation checkpoint 1008 for the trip by vehicle 202 along route 316.

In the exemplary embodiment, trip data 1002 includes a start point (e.g., origin) and an end point (e.g., destination) of the trip. Trip data 1002 may further include information as to real-time traffic volume along route 316, an estimated time of arrival ("ETA"), as well as navigation data, such as a navigation map of route 316. Trip data 1002 may be received from vehicle control system 208 (shown in FIG. 2). Vehicle data 1006 may include a vehicle identifier, diagnostics history associated with vehicle 202 (shown in FIG. 2), and data transmission and reception capabilities of vehicle 202. Vehicle data 1006, such as the vehicle identifier and vehicle data capabilities, may be received from vehicle telematics data transmitted by vehicle 202. Vehicle diagnostics history may be retrieved from reference databases 902, such as diagnostics history database 906 (both shown in FIG. 9).

REU data 1004 may include the location (e.g., geographic coordinates) of REUs along route 316. REU data 1004 may further include infrastructure data associated with each available REU, such as the data transmission and reception capabilities of each available REU as well as the bandwidth and real-time data traffic flow of each REU located along route 316. VDTD server 304 may retrieve REU data 1004 from REU infrastructure database 910 (shown in FIG. 9). In the exemplary embodiment, VDTD server 304 uses the above-described datasets to select an REU located along route 316 to serve as data latency evaluation checkpoint 1008 for a trip by vehicle 202 along route 316.

Exemplary Vehicle Data Transmission Diagnostics (VDTD) Server

Figure 11:
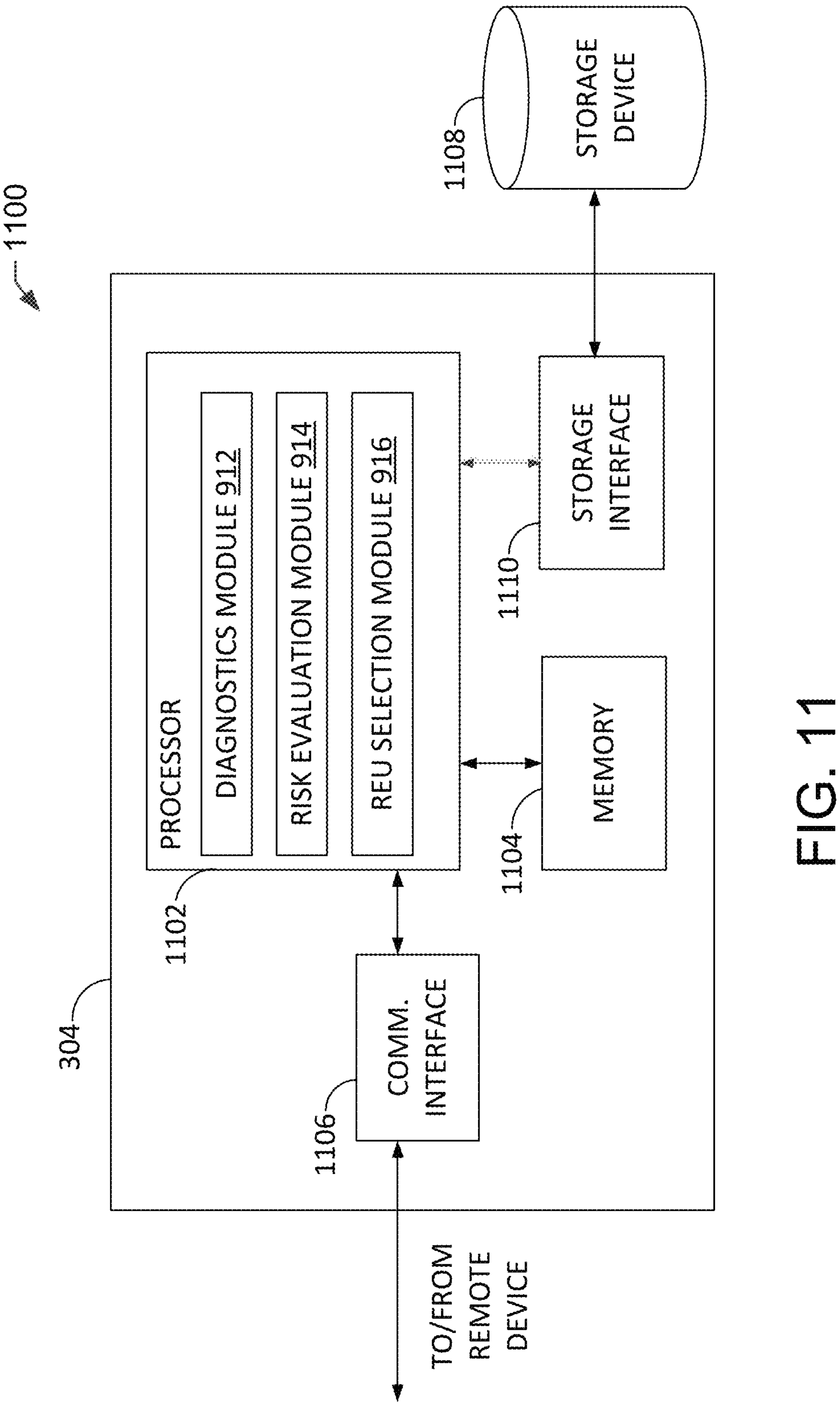
FIG. 11 illustrates an exemplary configuration of the VDTD server (shown in FIG. 3), in accordance with one embodiment of the present disclosure.

FIG. 11 depicts an exemplary configuration 1100 of vehicle data transmission diagnostics (VDTD) server 304 (shown in FIG. 9) in accordance with one embodiment of the present disclosure. VDTD server 304 includes a processor 1102 for executing instructions. Instructions are stored in a memory area 1104, for example. Processor 1102 includes one or more processing units (e.g., in a multi-core configuration).

In the exemplary embodiment, processor 1102 is operable to execute diagnostics module 912, risk evaluation module 914, and REU selection module 916. Modules 912, 914, and 916 may include specialized instruction sets, and/or coprocessors. Diagnostics module 912 may determine when a DLRE is needed for a vehicle, such as vehicle 202 (shown in FIG. 2). Diagnostics module 912 may be configured to determine a type of evaluation data packet that needs to be transmitted to vehicle 202 based upon, for example, a type of simulated driving condition that needs to be evaluated. Diagnostics module 912 may also be configured to utilize vehicle telematics data, and sensor data from, for example, traffic light sensors associated with traffic lights 110 (shown in FIG. 1) to determine which available REU along a route, such as route 316 should be assigned as a data latency evaluation checkpoint for a trip by vehicle 202 (all shown in FIG. 3).

REU selection module 916 may be configured to select an eligible REU as the data latency evaluation checkpoint for an upcoming trip. REU selection module 916 may utilize trip data 1002, REU data 1004, and/or vehicle data 1006 to select an REU to serve as a data latency evaluation checkpoint (all shown in FIG. 10). Risk evaluation module 914 may be configured to receive a transformed evaluation data packet from the selected REU, and analyze the data in the transformed evaluation data packet to quantify the risk posed by vehicle 202. In some embodiments, risk evaluation module 914 generates a risk evaluation record (not shown) for a data latency evaluation process performed during the trip.

In the exemplary embodiment, processor 1102 is operatively coupled to a communication interface 1106 such that VDTD server 304 is capable of communicating with remote device(s) such as vehicle control system 208, insurer network 920, and REUs, such as REU 302 (all shown in FIG. 9) (for example, using wireless communication or data transmission over one or more radio links or digital communication channels). For example, communication interface 1106 may receive requests for risk evaluation records from computer devices associated with, for example, insurer network 920 and/or vehicle manufacturers via the Internet or other network.

Processor 1102 may also be operatively coupled to a storage device 1108. Storage device 1108 may be any computer-operated hardware suitable for storing and/or retrieving data. In some embodiments, storage device 1108 may be integrated in VDTD server 304. For example, VDTD server 304 may include one or more hard disk drives as storage device 1108.

In other embodiments, storage device 1108 is external to VDTD server 304 and is accessed by a plurality of computer devices. For example, storage device 1108 may include a storage area network (SAN), a network attached storage (NAS) system, and/or multiple storage units such as hard disks and/or solid state disks in a redundant array of inexpensive disks (RAID) configuration.

In some embodiments, processor 1102 may be operatively coupled to storage device 1108 via a storage interface 1110. Storage interface 1110 may be any component capable of providing processor 1102 with access to storage device 1108. Storage interface 1110 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1102 with access to storage device 1108.

Processor 1102 may execute computer-executable instructions for implementing aspects of the disclosure. In some embodiments, processor 1102 may be transformed into a special purpose microprocessor by executing computer-executable instructions or by otherwise being programmed. For example, processor 1102 may be programmed with the instruction such as those illustrated in FIG. 12.

Memory areas 1104 and 918 (shown in FIG. 9) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Computer-Implemented Method for Selecting a Roadside Evaluation Unit

FIG. 12 illustrates a flow chart of an exemplary computer-implemented process 1200 for one aspect of selecting a roadside evaluation unit (REU) to serve as a data latency evaluation checkpoint for a vehicle, such as vehicle 202 during a trip by vehicle 202 along route 316 (all shown in FIG. 3). Process 1200 may be implemented by a computing device, such as, for example VDTD server 304 (shown in FIG. 9). In the exemplary embodiment, VDTD server 304 may be in communication with REUs, such as REU 302, and a vehicle control system, such as vehicle control system 208 (both shown in FIG. 9).

In the exemplary embodiment, VDTD server 304 may determine 1202 that a data latency risk evaluation (DLRE) should occur for vehicle 202. The determination may depend on factors, such as available and/or downloaded software updates for vehicle control system 208, approaching policy renewals, passage of time, miles driven, geographic region, driving environment, results of prior DLREs, driving patterns, and/or driving behavior. VDTD server 304 may transmit 1204 a DLRE request to vehicle control system 208 of vehicle 202 to determine a time period and a geographical region for performing the DLRE. The DLRE request may request that a DLRE occur during an upcoming trip. In certain embodiments, the DLRE request may designate a time period in which a DLRE needs to occur for vehicle 202. Vehicle control system 208 may queue the DLRE request for an upcoming trip. Before the upcoming trip, vehicle control system 208 may select a route for the trip.

VDTD server 304 may receive 1206, from vehicle control system 208, a response to the transmitted DLRE request. The response may include trip data for an upcoming trip, such as trip data 1002 (shown in FIG. 10). In the exemplary embodiment, trip data includes the route selected by vehicle control system 208 for the upcoming trip. VDTD server 304 may subsequently identify 1208, based upon the received trip data, roadside evaluation units (REUs) located near the selected route.

In some embodiments, VDTD server 304 may identify all REUs along the selected route that may potentially serve as a data latency evaluation checkpoint for vehicle 202. In further embodiments, VDTD server 304 may exclude REUs that are not located along the selected route and/or are too far from the selected route. VDTD server 304 selects 1210, from the identified REUs, a REU to serve as the data latency evaluation checkpoint for the upcoming trip. In embodiments where more than one identified REU may serve as the data latency evaluation checkpoint, VDTD server 304 may be configured to randomly select an REU among the eligible REUs.

Exemplary Embodiments & Functionality

In one aspect, a system for validating automated or autonomous vehicle data transmission capabilities of a vehicle is provided. The system may include a vehicle data transmission diagnostics (VDTD) server in communication with the vehicle and a plurality of roadside evaluation units. The VDTD server may comprise at least one processor and at least one memory device. The at least one processor may be programmed to: (i) determine that a data latency risk evaluation (DLRE) should be performed on the vehicle, (ii) transmit, to the vehicle, a data latency risk evaluation (DLRE) request to determine a time period and a geographical region for performing the DLRE, (iii) receive, from the vehicle, a response to the transmitted DLRE request including trip data, where the trip data includes a selected route to be taken by the vehicle for an upcoming trip, (iv) interrogate the plurality of roadside evaluation units based upon the received trip data, the plurality of roadside evaluation units being located along the selected route, and/or (v) select, based upon the interrogation, one of the plurality of roadside evaluation units to be a data latency evaluation checkpoint for the vehicle during the upcoming trip.

A further enhancement may be where the at least one processor is further programmed to identify, based upon the interrogation, a subset of roadside evaluation units from the plurality of roadside evaluation units. The subset may include roadside evaluation units that are eligible to be the data latency evaluation checkpoint for the upcoming trip.

A further enhancement may be where the at least one processor is further programmed to randomly select one roadside evaluation unit from the subset to be the data latency evaluation checkpoint.

A further enhancement may be where the at least one processor is further programmed to calculate, based upon the received trip data, an evaluation area. The evaluation area may be a geographic area where the data latency evaluation will occur.

A further enhancement may be where the at least one processor is further programmed to calculate an estimated time as to when the vehicle will be within the evaluation area. A further enhancement may be where the at least one processor is further programmed to instruct the data latency evaluation checkpoint to transmit an evaluation data packet to the vehicle when the vehicle is within the evaluation area.

A further enhancement may be where the at least one processor is further programmed to receive, from the interrogation, data as to each of the plurality of roadside evaluation units. The data may include a signal reception range of each of the plurality of roadside evaluation units. A further enhancement may be where the at least one processor is further programmed to select the one of the plurality of roadside evaluation units based upon a distance between each roadside evaluation unit and the selected route.

A further enhancement may be where the at least one processor is further programmed to select the one of the plurality of roadside evaluation units based upon vehicle data transmission capabilities of the vehicle and of each of the plurality of roadside evaluation units. A further enhancement may be where the at least one processor is further programmed to receive, from the interrogation, real-time bandwidth and network performance data of each of the plurality of roadside evaluation units.

A further enhancement may be where the at least one processor is further programmed to receive, from at least one traffic light, traffic data associated with the selected route, and/or select the one of the plurality of roadside evaluation units based at least upon the received traffic data. A further enhancement may be where the at least one processor is further programmed to determine that the DLRE needs to be performed based upon at least one of an available software update for the vehicle, a software update downloaded by the vehicle, and an upcoming policy renewal.

A further enhancement may be where the at least one processor is further programmed to: (i) receive, from the data latency evaluation checkpoint, a transformed evaluation data packet associated with the vehicle, (ii) analyze the data within the transformed evaluation data packet to assess the data transmission capabilities of the vehicle, and/or (iii) quantify a risk associated with the vehicle based upon the analysis. A further enhancement may be where the at least one processor is further programmed to generate a risk evaluation record for the transformed evaluation data packet.

A further enhancement may be where the at least one processor is further programmed to: (i) store the risk evaluation record in the at least one memory device, and/or (ii) transmit the risk evaluation record to a remote-computing device to update at least one of an underwriting model and an actuarial model, the risk evaluation record used to adjust an insurance policy of an insurance holder.

In another aspect, a computer-implemented method for validating automated or autonomous vehicle data transmission capabilities of a vehicle is provided. The method may be implemented using a vehicle data transmission diagnostics (VDTD) server in communication with the vehicle and a plurality of roadside evaluation units. The VDTD server may comprise at least one processor and at least one memory device. The method may include: (i) determining, by the at least one processor, that a data latency risk evaluation (DLRE) should be performed on the vehicle, (ii) transmitting, by the at least one processor to the vehicle, a data latency risk evaluation (DLRE) request to determine a time period and a geographical region for performing the DLRE, (iii) receiving, from the vehicle at the at least one processor, a response to the transmitted DLRE request including trip data, where the trip data includes a selected route to be taken by the vehicle for an upcoming trip, (iv) interrogating, by the at least one processor, the plurality of roadside evaluation units based upon the received trip data, the plurality of roadside evaluation units being located along the selected route, and/or (v) selecting, based upon the interrogation by the at least one processor, one of the plurality of roadside evaluation units to be a data latency evaluation checkpoint for the vehicle during the upcoming trip.

A further enhancement may be where the method includes calculating, by the at least one processor, an estimated time as to when the vehicle will be within the evaluation area. A further enhancement may be where the method includes instructing the data latency evaluation checkpoint, by the at least one processor, to transmit an evaluation data packet to the vehicle when the vehicle is within the evaluation area.

A further enhancement may be where the method includes receiving, by the at least one processor, from the interrogation, data as to each of the plurality of roadside evaluation units. The data may include a signal reception range of each of the plurality of roadside evaluation units.

A further enhancement may be where the method includes selecting, by the at least one processor, the one of the plurality of roadside evaluation units based upon a distance between each roadside evaluation unit and the selected route. A further enhancement may be where the method includes selecting, by the at least one processor, the one of the plurality of roadside evaluation units based upon vehicle data transmission capabilities of the vehicle and of each of the plurality of roadside evaluation units.

A further enhancement may be where the method includes receiving, by the at least one processor, from the interrogation, real-time bandwidth and network performance data of each of the plurality of roadside evaluation units. A further enhancement may be where the method includes (i) receiving, by the at least one processor, from at least one traffic light, traffic data associated with the selected route, and/or (ii) selecting, by the at least one processor, the one of the plurality of roadside evaluation units based at least upon the received traffic data.

A further enhancement may be where the method includes determining, by the at least one processor, that the DLRE needs to be performed based upon at least one of an available software update for the vehicle, a software update downloaded by the vehicle, and an upcoming policy renewal. A further enhancement may be where the method includes (i) receiving, by the at least one processor, from the data latency evaluation checkpoint, a transformed evaluation data packet associated with the vehicle, (ii) analyzing, by the at least one processor, the data within the transformed evaluation data packet to assess the data transmission capabilities of the vehicle, and/or (iii) quantifying, by the at least one processor, a risk associated with the vehicle based upon the analysis.

A further enhancement may be where the method includes generating, by the at least one processor, a risk evaluation record for the transformed evaluation data packet. A further enhancement may be where the method includes (i) storing, by the at least one processor, the risk evaluation record in the at least one memory device, and/or (ii) transmitting, by the at least one processor, the risk evaluation record to a remote-computing device to update at least one of an underwriting model and an actuarial model, the risk evaluation record used to adjust an insurance policy of an insurance holder.

In yet another aspect, at least one non-transitory computer-readable storage media having computer-executable instructions embodied thereon is provided. When executed by a vehicle data transmission diagnostics (VDTD) server that is in communication with a vehicle and a plurality of roadside evaluation units, the VDTD server comprising at least one processor, the computer-executable instructions may cause the at least one processor to: (i) determine that a data latency risk evaluation (DLRE) should be performed on the vehicle, (ii) transmit, to the vehicle, a data latency risk evaluation (DLRE) request to determine a time period and a geographical region for performing the DLRE, (iii) receive, from the vehicle, a response to the transmitted DLRE request including trip data, where the trip data includes a selected route to be taken by the vehicle for an upcoming trip, (iv) interrogate the plurality of roadside evaluation units based upon the received trip data, the plurality of roadside evaluation units being located along the selected route, and/or (v) select, based upon the interrogation, one of the plurality of roadside evaluation units to be a data latency evaluation checkpoint for the vehicle during the upcoming trip.

A further enhancement may be where the computer-executable instructions further cause the processor to identify, based upon the interrogation, a subset of roadside evaluation units from the plurality of roadside evaluation units. The subset may include roadside evaluation units that are eligible to be the data latency evaluation checkpoint for the upcoming trip.

A further enhancement may be where the computer-executable instructions further cause the processor to randomly select one roadside evaluation unit from the subset to be the data latency evaluation checkpoint.

A further enhancement may be where the computer-executable instructions further cause the processor to calculate, based upon the received trip data, an evaluation area. The evaluation area may be a geographic area where the data latency evaluation will occur.

A further enhancement may be where the computer-executable instructions further cause the processor to calculate an estimated time as to when the vehicle will be within the evaluation area. A further enhancement may be where the computer-executable instructions further cause the processor to instruct the data latency evaluation checkpoint to transmit an evaluation data packet to the vehicle when the vehicle is within the evaluation area.

A further enhancement may be where the computer-executable instructions further cause the processor to receive, from the interrogation, data as to each of the plurality of roadside evaluation units. The data may include a signal reception range of each of the plurality of roadside evaluation units. A further enhancement may be where the computer-executable instructions further cause the processor to select the one of the plurality of roadside evaluation units based upon a distance between each roadside evaluation unit and the selected route.

A further enhancement may be where the computer-executable instructions further cause the processor to select the one of the plurality of roadside evaluation units based upon vehicle data transmission capabilities of the vehicle and of each of the plurality of roadside evaluation units. A further enhancement may be where the computer-executable instructions further cause the processor to receive, from the interrogation, real-time bandwidth and network performance data of each of the plurality of roadside evaluation units.

A further enhancement may be the computer-executable instructions further cause the processor to receive, from at least one traffic light, traffic data associated with the selected route, and/or select the one of the plurality of roadside evaluation units based at least upon the received traffic data. A further enhancement may be where the computer-executable instructions further cause the processor to determine that the DLRE needs to be performed based upon at least one of an available software update for the vehicle, a software update downloaded by the vehicle, and an upcoming policy renewal.

A further enhancement may be where the computer-executable instructions further cause the processor to: (i) receive, from the data latency evaluation checkpoint, a transformed evaluation data packet associated with the vehicle, (ii) analyze the data within the transformed evaluation data packet to assess the data transmission capabilities of the vehicle, and/or (iii) quantify a risk associated with the vehicle based upon the analysis. A further enhancement may be where the computer-executable instructions further cause the processor to generate a risk evaluation record for the transformed evaluation data packet.

A further enhancement may be where the computer-executable instructions further cause the processor to: (i) store the risk evaluation record in the at least one memory device, and/or (ii) transmit the risk evaluation record to a remote-computing device to update at least one of an underwriting model and an actuarial model, the risk evaluation record used to adjust an insurance policy of an insurance holder.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing system for validating automated vehicle data transmission capabilities of a vehicle, the computing system comprising a vehicle data transmission diagnostics (VDTD) server in communication with (i) a vehicle control system of the vehicle and (ii) a plurality of roadside evaluation units, the VDTD server comprising at least one processor and at least one memory device, wherein the at least one processor:

receives, from the vehicle control system, trip data associated with an upcoming trip to be taken by the vehicle;

determines that a data latency risk evaluation (DLRE) should be performed on the vehicle based upon one or more data factors associated with operation of the vehicle, the one or more data factors including at least one of an available software update for the vehicle, a software update downloaded by the vehicle, or an upcoming policy renewal;

in response to determining that the DLRE should be performed, (i) determines, based upon the received trip data, an evaluation area to perform the DLRE, the evaluation area being a geographic area where one or more specific tests will occur, and (ii) selects, based upon the evaluation area and interrogating the plurality of roadside evaluation units, one of the plurality of roadside evaluation units to be a data latency evaluation checkpoint for the vehicle during the upcoming trip; and transmits instructions to the data latency evaluation checkpoint, wherein the instructions indicate an evaluation data packet to be transmitted by the data latency evaluation checkpoint to the vehicle control system, and wherein the evaluation data packet causes the vehicle control system to execute the one or more specific tests associated with the DLRE for assessing a response of vehicle components of the vehicle to the one or more specific tests.

2. The computing system of claim 1, wherein the trip data includes a selected route to be taken by the vehicle for the upcoming trip.

3. The computing system of claim 1, wherein the at least one processor interrogates the plurality of roadside evaluation units based upon the trip data.

4. The computing system of claim 1, wherein the at least one processor selects the one of the plurality of roadside evaluation units based upon vehicle data transmission capabilities of the vehicle and of each of the plurality of roadside evaluation units.

5. A computer-implemented method for validating automated vehicle data transmission capabilities of a vehicle, the method implemented using a vehicle data transmission diagnostics (VDTD) server in communication with (i) a vehicle control system of the vehicle and (ii) a plurality of roadside evaluation units, the VDTD server including at least one processor and at least one memory device, the method comprising:

receiving, from the vehicle control system, trip data associated with an upcoming trip to be taken by the vehicle;

determining that a data latency risk evaluation (DLRE) should be performed on the vehicle based upon one or more data factors associated with operation of the vehicle, the one or more data factors including at least one of an available software update for the vehicle, a software update downloaded by the vehicle, or an upcoming policy renewal;

in response to determining that the DLRE should be performed, (i) determining, based upon the received trip data, an evaluation area to perform the DLRE, the evaluation area being a geographic area where one or more specific tests will occur, and (ii) selecting, based upon the evaluation area and interrogating the plurality of roadside evaluation units, one of the plurality of roadside evaluation units to be a data latency evaluation checkpoint for the vehicle during the upcoming trip; and transmitting instructions to the data latency evaluation checkpoint, wherein the instructions indicate an evaluation data packet to be transmitted by the data latency evaluation checkpoint to the vehicle control system, and wherein the evaluation data packet causes the vehicle control system to execute the one or more specific tests associated with the DLRE for assessing a response of vehicle components of the vehicle to the one or more specific tests.

6. The computer-implemented method of claim 5, wherein the trip data includes a selected route to be taken by the vehicle for the upcoming trip.

7. The computer-implemented method of claim 5, further comprising interrogating the plurality of roadside evaluation units based upon the trip data.

8. The computer-implemented method of claim 5, further comprising selecting the one of the plurality of roadside evaluation units based upon vehicle data transmission capabilities of the vehicle and of each of the plurality of roadside evaluation units.

9. At least one non-transitory computer-readable storage medium having computer-executable instructions embodied thereon, wherein when executed by a vehicle data transmission diagnostics (VDTD) server that is in communication with (i) a vehicle control system of a vehicle and (ii) a plurality of roadside evaluation units, the VDTD server comprising at least one processor and at least one memory device, the computer-executable instructions cause the at least one processor to:

receive, from the vehicle control system, trip data associated with an upcoming trip to be taken by the vehicle;

determine that a data latency risk evaluation (DLRE) should be performed on the vehicle based upon one or more data factors associated with operation of the vehicle, the one or more data factors including at least one of an available software update for the vehicle, a software update downloaded by the vehicle, or an upcoming policy renewal;

in response to determining that the DLRE should be performed, (i) determine, based upon the received trip data, an evaluation area to perform the DLRE, the evaluation area being a geographic area where one or more specific tests will occur, and (ii) select, based upon the evaluation area and interrogating the plurality of roadside evaluation units, one of the plurality of roadside evaluation units to be a data latency evaluation checkpoint for the vehicle during the upcoming trip; and transmit instructions to the data latency evaluation checkpoint, wherein the instructions indicate an evaluation data packet to be transmitted by the data latency evaluation checkpoint to the vehicle control system, and wherein the evaluation data packet causes the vehicle control system to execute the one or more specific tests associated with the DLRE for assessing a response of vehicle components of the vehicle to the one or more specific tests.

10. The at least one non-transitory computer-readable storage medium of claim 9, wherein the trip data includes a selected route to be taken by the vehicle for the upcoming trip.

11. The at least one non-transitory computer-readable storage medium of claim 9, wherein the computer-executable instructions further cause the at least one processor to interrogate the plurality of roadside evaluation units based upon the trip data.

12. The at least one non-transitory computer-readable storage medium of claim 9, wherein the computer-executable instructions further cause the at least one processor to select the one of the plurality of roadside evaluation units based upon vehicle data transmission capabilities of the vehicle and of each of the plurality of roadside evaluation units.

* * * * *